US012676419B2

(12) United States Patent
Qin et al.

(10) Patent No.: US 12,676,419 B2
(45) Date of Patent: Jul. 7, 2026

(54) ANTENNA STRUCTURE AND ELECTRONIC DEVICE

(71) Applicant: Honor Device Co., Ltd., Shenzhen (CN)

(72) Inventors: Chang Qin, Shenzhen (CN); Tiezhu Liang, Shenzhen (CN); Chao Feng, Shenzhen (CN); Guannan Chen, Shenzhen (CN); Yihang Hao, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 51 days.

(21) Appl. No.: 18/838,877

(22) PCT Filed: May 10, 2023

(86) PCT No.: PCT/CN2023/093185
§ 371 (c)(1),
(2) Date: Aug. 15, 2024

(87) PCT Pub. No.: WO2024/027258
PCT Pub. Date: Feb. 8, 2024

(65) Prior Publication Data

US 2025/0158287 A1 May 15, 2025

(30) Foreign Application Priority Data

Aug. 3, 2022 (CN) ......................... 202210926634.4

(51) Int. Cl.
*H01Q 1/36* (2006.01)
*H01Q 5/328* (2015.01)
(Continued)

(52) U.S. Cl.
CPC ............. *H01Q 13/10* (2013.01); *H01Q 5/328* (2015.01); *H01Q 1/241* (2013.01)

(58) Field of Classification Search
CPC ........ H01Q 13/10; H01Q 5/328; H01Q 1/241; H01Q 1/243; H01Q 5/378; H01Q 9/42;
(Continued)

(56) References Cited

U.S. PATENT DOCUMENTS 10,389,012 B2 8/2019 Han et al.
11,942,702 B2 3/2024 Sakurai
(Continued)

FOREIGN PATENT DOCUMENTS

CN 104300215 A 1/2015
CN 104733831 A * 6/2015
(Continued)

OTHER PUBLICATIONS

Nasimuddin et al., "A Wideband High Gain Circularly Polarized Antenna for Satellite Applications," 2019 IEEE Asia-Pacific Microwave Conference (APMC), Singapore, pp. 234-236 (Dec. 10-13, 2019).

*Primary Examiner* — Dimary S Lopez Cruz
*Assistant Examiner* — Bamidele A Immanuel
(74) *Attorney, Agent, or Firm* — Leydig, Voit & Mayer, Ltd.

(57) ABSTRACT

Embodiments of this application provide an antenna structure. The antenna structure includes a first radiation stub, a second radiation stub, and a first feed. The first radiation stub includes two grounding points and a first feed point. The first feed point is located between the two grounding points, and the two grounding points are configured for grounding. The first radiation stub is spaced apart from a ground connected to the two grounding points to form a slot, and the first radiation stub forms a slot antenna. The second radiation stub has a gap with the first radiation stub, and the second radiation stub is coupled to the first radiation stub through the gap. The first feed is electrically connected to the first
(Continued)

feed point of the first radiation stub and is configured to provide a first feed signal for the first radiation stub by using the first feed point.

17 Claims, 10 Drawing Sheets

(51) Int. Cl.
*H01Q 13/10* (2006.01)
*H01Q 1/24* (2006.01)

(58) Field of Classification Search
CPC ............ H01Q 1/36; H01Q 1/242; H01Q 1/48; H01Q 1/50; H01Q 5/28; H01Q 5/307
See application file for complete search history.

(56) References Cited

U.S. PATENT DOCUMENTS

| | | | | |
|---|---|---|---|---|
| 2004/0257283 | A1 | 12/2004 | Asano et al. | |
| 2014/0132467 | A1* | 5/2014 | Park | H01Q 1/52 343/770 |
| 2016/0049719 | A1* | 2/2016 | Tseng | H01Q 9/42 343/702 |
| 2016/0064820 | A1* | 3/2016 | Kim | H01Q 1/243 343/767 |
| 2017/0365912 | A1* | 12/2017 | Su | H01Q 1/243 |
| 2018/0375196 | A1* | 12/2018 | Han | H01Q 1/243 |
| 2018/0375971 | A1* | 12/2018 | Sun | H01Q 1/243 |
| 2020/0058993 | A1* | 2/2020 | Qiu | H01Q 5/30 |
| 2021/0075090 | A1* | 3/2021 | Yarga | H01Q 1/241 |
| 2021/0320392 | A1* | 10/2021 | Hsu | H01Q 5/328 |
| 2021/0399406 | A1* | 12/2021 | Tsai | H01Q 5/328 |
| 2022/0069468 | A1* | 3/2022 | Hsu | H01Q 5/20 |
| 2022/0223999 | A1* | 7/2022 | Wu | H01Q 9/42 |
| 2022/0263243 | A1* | 8/2022 | Sakurai | H01Q 9/16 |
| 2023/0006360 | A1* | 1/2023 | Yang | H01Q 5/335 |
| 2023/0070301 | A1* | 3/2023 | Xie | H01Q 1/243 |
| 2023/0208032 | A1* | 6/2023 | Wang | H01Q 13/10 |
| 2024/0079796 | A1* | 3/2024 | Jiang | H01Q 1/521 |
| 2025/0096453 | A1* | 3/2025 | Cai | H01Q 1/2266 |
| 2025/0202116 | A1* | 6/2025 | Song | H01Q 1/50 |

FOREIGN PATENT DOCUMENTS

| | | | | | |
|---|---|---|---|---|---|
| CN | 107453056 | A | | 12/2017 | |
| CN | 108767499 | A | | 11/2018 | |
| CN | 208522084 | U | * | 2/2019 | |
| CN | 109586036 | A | | 4/2019 | |
| CN | 105161845 | B | * | 5/2019 | |
| CN | 110832829 | A | | 2/2020 | |
| CN | 108780941 | B | * | 10/2020 | H01Q 1/27 |
| CN | 113394547 | A | | 9/2021 | |
| CN | 113708050 | A | | 11/2021 | |
| CN | 108511904 | B | * | 12/2021 | H01Q 1/2258 |
| CN | 114899599 | A | * | 8/2022 | H01Q 1/22 |
| CN | 114944548 | A | * | 8/2022 | H01Q 1/48 |
| CN | 115224475 | A | | 10/2022 | |
| CN | 113451741 | B | * | 1/2023 | H01Q 1/242 |
| CN | 116130939 | A | * | 5/2023 | H01Q 1/242 |
| CN | 116247420 | A | * | 6/2023 | H01Q 5/28 |
| CN | 117543211 | A | * | 2/2024 | H01Q 5/50 |
| TW | I691117 | B | * | 4/2020 | H01Q 5/35 |
| WO | WO-2020135146 | A1 | * | 7/2020 | H01Q 1/50 |
| WO | 2021090453 | A1 | | 5/2021 | |
| WO | 2021093684 | A1 | | 5/2021 | |

* cited by examiner

ANTENNA STRUCTURE AND ELECTRONIC DEVICE

CROSS-REFERENCE TO RELATED APPLICATIONS

This application is a national stage of International Application No. PCT/CN2023/093185, filed on May 10, 2023, which claims priority to Chinese Patent Application No. 202210926634.4, filed on Aug. 3, 2022. The disclosures of both of the aforementioned applications are hereby incorporated by reference in their entireties.

TECHNICAL FIELD

This application relates to the field of communication technology, and in particular, to an antenna structure and an electronic device having the antenna structure.

BACKGROUND

At present, with the popularization of 5G antennas, a quantity of antennas included in an electronic device is increasing, but due to the gradual popularization of a full-screen and a curved screen, there is less and less clearance left for antennas. Moreover, because a user may block radiation of the antennas when holding the electronic device, positions of current antennas avoid a holding part of the electronic device held by the user to a certain extent. For example, current antennas are mostly arranged at an upper half part of the electronic device. Therefore, an area in which antennas can be arranged is greatly reduced. However, the quantity of antennas is increasing, which limits sizes and the like of the antennas, thereby limiting performance of the antennas.

SUMMARY

This application provides an antenna structure and an electronic device, to effectively improve performance of an antenna.

According to a first aspect, an antenna structure is provided. The antenna structure includes a first radiation stub, a second radiation stub, and a first feed. The first radiation stub includes two grounding points and a first feed point, where the first feed point is located between the two grounding points, the two grounding points are configured for grounding, the first radiation stub is spaced apart from a ground connected to the two grounding points to form a slot, and the first radiation stub forms a slot antenna. The second radiation stub has a gap with the first radiation stub, and the second radiation stub is coupled to the first radiation stub through the gap. The first feed is electrically connected to the first feed point of the first radiation stub and is configured to provide a first feed signal for the first radiation stub by using the first feed point, and couple and load the first feed signal to the second radiation stub through the gap, so that the first radiation stub and the second radiation stub support transceiving of electromagnetic wave signals on a first frequency band. Therefore, because the first radiation stub forms the slot antenna, an excitation current generated after the first feed provides the first feed signal for the first radiation stub flows in the slot between the first radiation stub and the ground connected to the two grounding points, so that holding by a user has little impact on the excitation current, thereby allowing the first radiation stub and the second radiation stub to be arranged at parts of the electronic device that are often held by the user. Space of the electronic device can be fully utilized, so that a size of the first radiation stub meets a performance requirement. In addition, a bandwidth of the first frequency band can be effectively increased by arranging the second radiation stub for coupled feeding.

In a possible implementation, a resonant frequency at which the first radiation stub operates under excitation of the first feed signal is a first resonant frequency, a resonant frequency at which the second radiation stub operates under excitation of the first feed signal is a second resonant frequency, the second resonant frequency is greater than the first resonant frequency, and the first frequency band includes a frequency range from the first resonant frequency to the second resonant frequency. Therefore, resonance is performed by using the two radiation stubs. Due to coupled feeding of the second radiation stub, the first resonant frequency and the second resonant frequency are close, and frequencies near the first resonant frequency and the second resonant frequency and frequencies between the first resonant frequency and the second resonant frequency are all frequencies with high resonant energy, thereby achieving good radio frequency transceiving performance. Therefore, the antenna structure according to this application can well support the transceiving of the electromagnetic wave signals on the first frequency band including the frequency range from the first resonant frequency to the second resonant frequency, and effectively increase the bandwidth.

In a possible implementation, the two grounding points include a first grounding point and a second grounding point, the first grounding point is arranged at a first end of the first radiation stub, the second grounding point is arranged at a second end of the first radiation stub, the first end is an end away from the second radiation stub, the second end is an end adjacent to the second radiation stub, the antenna structure further includes a first matching circuit, the first grounding point is directly grounded, and the second grounding point is grounded by using the first matching circuit. Therefore, the second grounding point is grounded by using the first matching circuit, so that an operating frequency of the slot antenna formed by the first radiation stub can be matched and adjusted, and the resonant frequency of the first radiation stub can be adjusted to the first resonant frequency more accurately.

In a possible implementation, the first matching circuit includes a matching inductor. Therefore, further tuning and matching are implemented by using the inductor, which is an inductive element, effectively ensuring that the first radiation stub resonates at the first resonant frequency.

In a possible implementation, the antenna structure further includes a second matching circuit, and the first feed is electrically connected to the feed point of the first radiation stub by using the second matching circuit. Therefore, a feed signal of the first feed is matched and adjusted by using the second matching circuit, so that the resonant frequency of the first radiation stub can be further adjusted to the first resonant frequency more accurately.

In a possible implementation, the second matching circuit includes a plurality of matching elements, and the plurality of matching elements include at least one of an inductor and a capacitor. Therefore, more accurate and finer adjustment can be implemented by using a matching network composed of the plurality of matching elements.

In a possible implementation, the second radiation stub includes a second feed point, and the antenna structure further includes a second feed and a third matching circuit, the second feed is connected to the second feed point by using the third matching circuit, and provides a second feed signal for the second radiation stub, to excite the second radiation stub to operate on a second frequency band. Therefore, the second radiation stub can not only be configured to operate at the second resonant frequency and nearby frequencies on the first frequency band under the excitation of the first feed signal to support transceiving of electromagnetic wave signals with some frequencies in the first frequency band, but also operate on the second frequency band under the excitation of the second feed signal to support transceiving of electromagnetic wave signals on the second frequency band, thereby effectively improving the frequency band of the multi-antenna structure and further increasing the bandwidth.

In a possible implementation, the antenna structure further includes a switch, the switch is connected between the third matching circuit and the second feed point, and the switch is configured to be off when the antenna structure operates on the first frequency band. Therefore, quality of the electromagnetic wave signals on the first frequency band can be effectively guaranteed, and interference from the second frequency band can be avoided.

In a possible implementation, the third matching circuit includes a plurality of matching elements and at least one matching switch, at least one of the plurality of matching elements is connected in series to a matching switch, and the matching switch is configured to switch an on or off state when the antenna structure operates on the first frequency band, so as to adjust an operating frequency of the second radiation stub under excitation of the second feed. Therefore, the operating frequency of the second radiation stub under the excitation of the second feed can be adjusted by switching the on or off state of the matching switch, so that the operating frequency of the second radiation stub is different from frequencies on the first frequency band, and the quality of the electromagnetic wave signals on the first frequency band can also be effectively ensured.

In a possible implementation, a length of the second radiation stub is ½ of a wavelength corresponding to the second resonant frequency. Therefore, when the second radiation stub is electrically connected to the second feed, the length of the second radiation stub is ½ of the wavelength corresponding to the second resonant frequency, so that the second radiation stub can resonate at the second resonant frequency, and can also operate on the second frequency band under the excitation of the second feed signal of the second feed.

In a possible implementation, the second radiation stub includes a third grounding point, the third grounding point is configured for grounding, and a length of a part of the second radiation stub that is located between the third grounding point and the gap is ¼ of a wavelength corresponding to the second resonant frequency. Therefore, in this case, the length of the part of the second radiation stub that is located between the third grounding point and the gap only needs to be ¼ of the wavelength corresponding to the second resonant frequency. Therefore, the length of the second radiation stub can be effectively shortened, and space is saved.

In a possible implementation, the first frequency band is a GPS L5 frequency band. Due to a large size required for an antenna in the GPS L5 frequency band, the antenna structure implementing the GPS L5 frequency band is arranged at parts of the electronic device that are often held by the user, to meet requirements for the antenna size by the GPS L5 frequency band and improve performance. Moreover, the above antenna structure can avoid being affected during holding.

In a possible implementation, the antenna structure is used in an electronic device, and the electronic device includes a top end, a bottom end, and a side edge located between the top end and the bottom end; when the antenna structure is installed in the electronic device, the first radiation stub is arranged on the side edge of the electronic device, the second radiation stub extends and is arranged on the side edge and the bottom end of the electronic device, and the second radiation stub is away from the top end of the electronic device relative to the first radiation stub. Therefore, the antenna structure may be arranged on the side edge and the bottom end that are parts often held by the user, so that the space can be effectively utilized, and the above antenna structure can avoid being affected during holding.

In a possible implementation, the first radiation stub is located on the side edge of the electronic device and has a preset distance from the top end of the electronic device, the first radiation stub is elongated, the second radiation stub includes a first sub-stub and a second sub-stub, the first sub-stub is arranged at an included angle with the second sub-stub, the first sub-stub is adjacent to the first radiation stub to have the gap with the first radiation stub, and the first sub-stub is parallel to the first radiation stub; when the antenna structure is installed in the electronic device, the first radiation stub is located on the side edge of the electronic device, the first sub-stub of the second radiation stub is located on the side edge of the electronic device at a position close to the bottom end, and the second sub-stub of the second radiation stub is located at the bottom end of the electronic device. Therefore, with the above structure, the antenna structure can be arranged by making full use of the side edge and the bottom end where the antenna would not be arranged originally, thereby making full use of the space of the electronic device, and antenna performance is not affected by the holding by the user, thereby effectively improving the antenna performance.

According to a second aspect, an electronic device is provided. The electronic device includes an antenna structure, and the antenna structure includes a first radiation stub, a second radiation stub, and a first feed. The first radiation stub includes two grounding points and a first feed point, where the first feed point is located between the two grounding points, the two grounding points are configured for grounding, the first radiation stub is spaced apart from a ground connected to the two grounding points to form a slot, and the first radiation stub forms a slot antenna. The second radiation stub has a gap with the first radiation stub, and the second radiation stub is coupled to the first radiation stub through the gap. The first feed is electrically connected to the first feed point of the first radiation stub and is configured to provide a first feed signal for the first radiation stub by using the first feed point, and couple and load the first feed signal to the second radiation stub through the gap, so that the first radiation stub and the second radiation stub support transceiving of electromagnetic wave signals on a first frequency band. Therefore, because the first radiation stub forms the slot antenna, an excitation current generated after the first feed provides the first feed signal for the first radiation stub flows in the slot between the first radiation stub and the ground connected to the two grounding points, so that holding by a user has little impact on the excitation current, thereby allowing the first radiation stub and the second radiation stub to be arranged at parts of the electronic device that are often held by the user. Space of the electronic device can be fully utilized, so that a size of the first radiation stub meets a performance requirement. In addition, a bandwidth of the first frequency band can be effectively increased by arranging the second radiation stub for coupled feeding.

In a possible implementation, a resonant frequency at which the first radiation stub operates under excitation of the first feed signal is a first resonant frequency, a resonant frequency at which the second radiation stub operates under excitation of the first feed signal is a second resonant frequency, the second resonant frequency is greater than the first resonant frequency, and the first frequency band includes a frequency range from the first resonant frequency to the second resonant frequency. Therefore, resonance is performed by using the two radiation stubs. Due to coupled feeding of the second radiation stub, the first resonant frequency and the second resonant frequency are close, and frequencies near the first resonant frequency and the second resonant frequency and frequencies between the first resonant frequency and the second resonant frequency are all frequencies with high resonant energy, thereby achieving good radio frequency transceiving performance. Therefore, the antenna structure according to this application can well support the transceiving of the electromagnetic wave signals on the first frequency band including the frequency range from the first resonant frequency to the second resonant frequency, and effectively increase the bandwidth.

In a possible implementation, the two grounding points include a first grounding point and a second grounding point, the first grounding point is arranged at a first end of the first radiation stub, the second grounding point is arranged at a second end of the first radiation stub, the first end is an end away from the second radiation stub, the second end is an end adjacent to the second radiation stub, the antenna structure further includes a first matching circuit, the first grounding point is directly grounded, and the second grounding point is grounded by using the first matching circuit. Therefore, the second grounding point is grounded by using the first matching circuit, so that an operating frequency of the slot antenna formed by the first radiation stub can be matched and adjusted, and the resonant frequency of the first radiation stub can be adjusted to the first resonant frequency more accurately.

In a possible implementation, the first matching circuit includes a matching inductor. Therefore, further tuning and matching are implemented by using the inductor, which is an inductive element, effectively ensuring that the first radiation stub resonates at the first resonant frequency.

In a possible implementation, the antenna structure further includes a second matching circuit, and the first feed is electrically connected to the feed point of the first radiation stub by using the second matching circuit. Therefore, a feed signal of the first feed is matched and adjusted by using the second matching circuit, so that the resonant frequency of the first radiation stub can be further adjusted to the first resonant frequency more accurately.

In a possible implementation, the second matching circuit includes a matching network composed of a plurality of matching elements, and the plurality of matching elements include at least one of an inductor and a capacitor. Therefore, more accurate and finer adjustment can be implemented by using a matching network composed of the plurality of matching elements.

In a possible implementation, the second radiation stub includes a second feed point, and the antenna structure further includes a second feed and a third matching circuit, the second feed is connected to the second feed point by using the third matching circuit, and provides a second feed signal for the second radiation stub, to excite the second radiation stub to operate on a second frequency band. Therefore, the second radiation stub can not only be configured to operate at the second resonant frequency and nearby frequencies on the first frequency band under the excitation of the first feed signal to support transceiving of electromagnetic wave signals with some frequencies on the first frequency band, but also operate on the second frequency band under the excitation of the second feed signal to support transceiving of electromagnetic wave signals on the second frequency band, thereby effectively improving the frequency band of the multi-antenna structure and further increasing the bandwidth.

In a possible implementation, the antenna structure further includes a switch, the switch is connected between the third matching circuit and the second feed point, and the switch is configured to be off when the antenna structure operates on the first frequency band. Therefore, quality of the electromagnetic wave signals on the first frequency band can be effectively guaranteed, and interference from the second frequency band can be avoided.

In a possible implementation, the third matching circuit includes a plurality of matching elements and at least one matching switch, at least one of the plurality of matching elements is connected in series to a matching switch, and the matching switch is configured to switch an on or off state when the antenna structure operates on the first frequency band, so as to adjust an operating frequency of the second radiation stub under excitation of the second feed. Therefore, the operating frequency of the second radiation stub under the excitation of the second feed can be adjusted by switching the on or off state of the matching switch, so that the operating frequency of the second radiation stub is different from frequencies on the first frequency band, and the quality of the electromagnetic wave signals on the first frequency band can also be effectively ensured.

In a possible implementation, a length of the second radiation stub is ½ of a wavelength corresponding to the second resonant frequency. Therefore, when the second radiation stub is electrically connected to the second feed, the length of the second radiation stub is ½ of the wavelength corresponding to the second resonant frequency, so that the second radiation stub can resonate at the second resonant frequency, and can also operate on the second frequency band under the excitation of the second feed signal of the second feed.

In a possible implementation, the second radiation stub includes a third grounding point, the third grounding point is configured for grounding, and a length of a part of the second radiation stub that is located between the third grounding point and the gap is ¼ of a wavelength corresponding to the second resonant frequency. Therefore, in this case, the length of the part of the second radiation stub that is located between the third grounding point and the gap only needs to be ¼ of the wavelength corresponding to the second resonant frequency. Therefore, the length of the second radiation stub can be effectively shortened, and space is saved.

In a possible implementation, the first frequency band is a GPS L5 frequency band. Due to a large size required for an antenna in the GPS L5 frequency band, the antenna structure implementing the GPS L5 frequency band is arranged at parts of the electronic device that are often held by the user, to meet requirements for the antenna size by the GPS L5 frequency band and improve performance. Moreover, the above antenna structure can avoid being affected during holding.

In a possible implementation, the electronic device includes a top end, a bottom end, and a side edge located between the top end and the bottom end; the first radiation stub is arranged on the side edge of the electronic device, the second radiation stub extends and is arranged on the side edge and the bottom end of the electronic device, and the second radiation stub is away from the top end of the electronic device relative to the first radiation stub. Therefore, the antenna structure may be arranged on the side edge and the bottom end that are parts often held by the user, so that the space can be effectively utilized, and the above antenna structure can avoid being affected during holding.

In a possible implementation, the first radiation stub is located on the side edge of the electronic device and has a preset distance from the top end of the electronic device, the first radiation stub is elongated, the second radiation stub includes a first sub-stub and a second sub-stub, the first sub-stub is arranged at an included angle with the second sub-stub, the first sub-stub is adjacent to the first radiation stub to have the gap with the first radiation stub, and the first sub-stub is parallel to the first radiation stub; the first radiation stub is located on the side edge of the electronic device, the first sub-stub of the second radiation stub is located on the side edge of the electronic device at a position close to the bottom end, and the second sub-stub of the second radiation stub is located at the bottom end of the electronic device. Therefore, with the above structure, the antenna structure can be arranged by making full use of the side edge and the bottom end where the antenna would not be arranged originally, thereby making full use of the space of the electronic device, and antenna performance is not affected by the holding by the user, thereby effectively improving the antenna performance.

In a possible implementation, a frame of the electronic device is a metal frame, and the first radiation stub and the second radiation stub are two metal frame segments formed by providing a gap in the metal frame of the electronic device.

In a possible implementation, a frame of the electronic device is a nonmetallic frame, and the first radiation stub and the second radiation stub are metal segments arranged in the frame of the electronic device.

In the antenna structure and the electronic device according to this application, the radiation stubs of the antenna structure can be allowed to be arranged at parts often held by the user, and the antenna performance is not affected by the holding by the user, so that the space of the electronic device can be effectively used to arrange the radiation stubs with larger sizes, thereby effectively improving the antenna performance.

BRIEF DESCRIPTION OF DRAWINGS

To describe technical solutions in embodiments or the background of this application more clearly, the following describes accompanying drawings required in embodiments or the background of this application.

DESCRIPTION OF EMBODIMENTS

Embodiments of this application are described below with reference to the accompanying drawings in the embodiments of this application.

Figure 1:
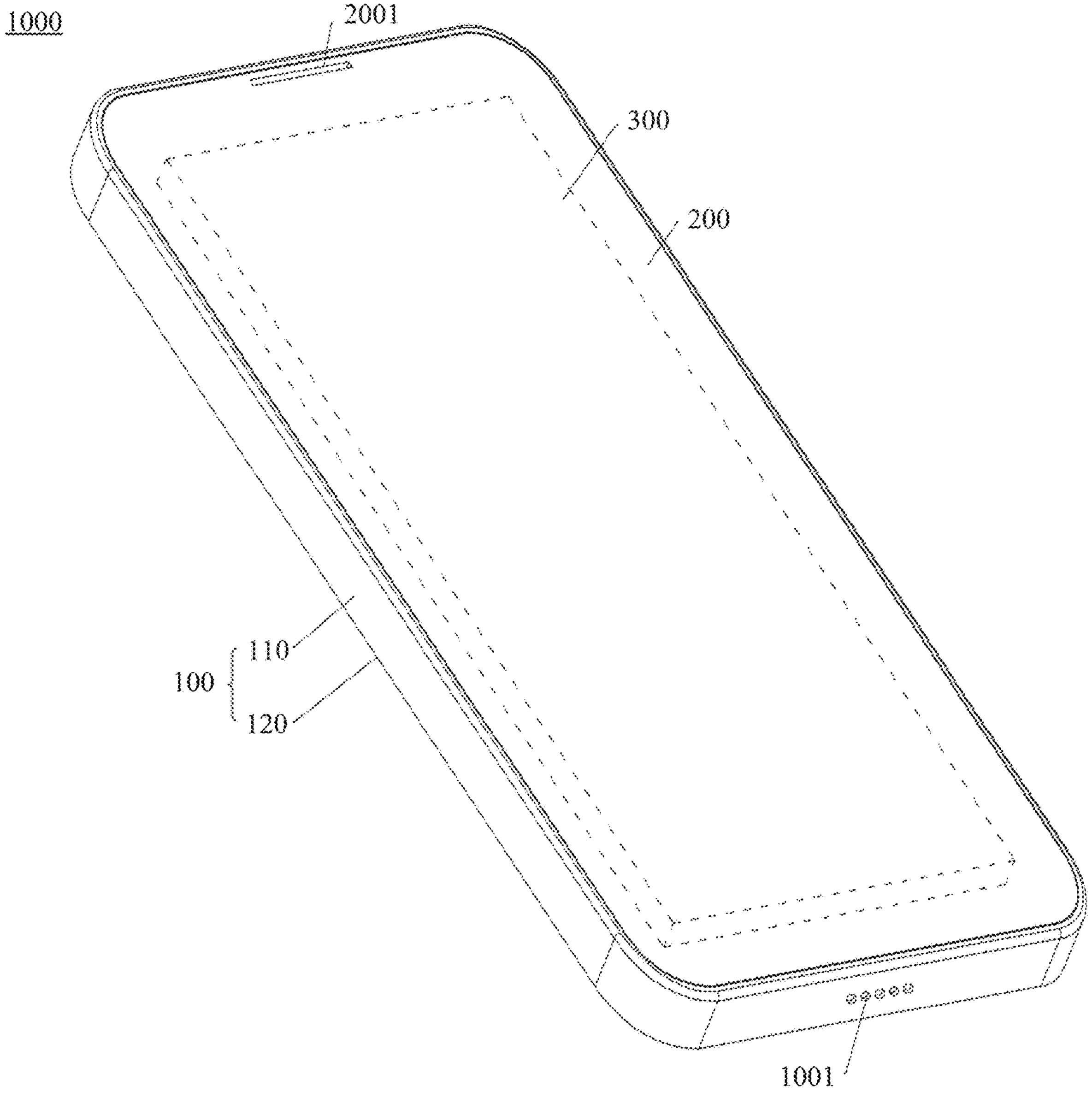
FIG. 1 is a schematic diagram of a structure of an electronic device according to an embodiment of this application.

FIG. 1 is a schematic diagram of a structure of an electronic device 1000 according to an embodiment of this application.

The electronic device 1000 may be an electronic device having a wireless communication function, for example, a handheld device, an in-vehicle device, a wearable device, a computer device, a wireless local area network (WLAN) device, or a router. In some application scenarios, the electronic device 1000 may alternatively be referred to a different name, for example, user equipment, an access terminal, a subscriber unit, a subscriber station, a mobile site, a mobile station, a remote station, a remote terminal, a mobile device, a user terminal, a wireless electronic device, a user agent or a user apparatus, a cellular phone, a wireless phone, a session initiation protocol (SIP) phone, a wireless local loop (WLL) station, a personal digital assistant (PDA), or a terminal device in a 5G network or future evolution network.

In some embodiments, the electronic device 1000 may alternatively be a device deployed in a wireless access network to provide wireless communication functions, including but not limited to: a base station, a relay station, an access point, an in-vehicle device, a wireless-fidelity (Wi-Fi) site, a wireless backhaul node, a small cell, a micro station, or the like. The base station may be a base transceiver station (BTS), a NodeB (Node B, or NB), an evolved NodeB (evolutional Node B, eNB, or eNodeB), a transmission node or a transmission reception point (TRP, or TP) or a next generation NodeB (generation node B, or gNB) in an new radio (NR) system, a base station or a network device in a future communication system, or the like. In this embodiment of this application, an example in which the electronic device 1000 is a mobile phone is used for description.

The electronic device 1000 includes a housing 100, a display module 200, a circuit board 300, a receiver (not shown in the figure), and a speaker (not shown in the figure). The display module 200 is installed in the housing 100 and matched with the housing 100 to form an accommodation cavity. The circuit board 300, the receiver, and the speaker are installed in the accommodation cavity.

The housing 100 may include a frame 110 and a back cover 120. The back cover 120 is fastened to one side of the frame 110. The frame 110 and the back cover 120 may be integrally formed to ensure structure stability of the housing 100. Alternatively, the frame 110 and the back cover 120 may be fastened to each other through assembling. The housing 100 is provided with a speaker hole 1001. There may be one or more speaker holes 1001. For example, there are a plurality of speaker holes 1001, and the plurality of speaker holes 1001 are disposed at the frame 110. The speaker hole 1001 is connected to an inner side of the housing 100 and an outer side of the housing 100. It should be noted that the "hole" described in this embodiment of this application refers to a hole having a complete hole wall.

The display module 200 is fastened on the other side of the frame 110. The display module 200 and the back cover 120 are respectively fastened on two sides of the frame 110. When a user uses the electronic device 1000, the display module 200 is placed toward the user, and the back cover 120 is placed away from the user. The display module 200 is provided with a receiving hole 2001, and the receiving hole 2001 is a through hole penetrating the display module 200. A surface of the display module 200 is a front face of the electronic device 1000, and a surface of the electronic device 1000 facing away from the display module 200 is a back face of the electronic device 1000. The back cover 120 is configured to encapsulate the back face of the electronic device 1000. The display module 200 includes a display and a driving circuit of the display. The display module 200 may be a touchable display module.

The circuit board 300 is located between the back cover 120 and the display module 200. The circuit board 300 may be a mainboard of the electronic device 1000. The receiver is located at a top end of the electronic device 1000. Sound emitted by the receiver may be transmitted to the outside of the electronic device 1000 from the receiving hole 2001, to implement a sound playing function of the electronic device 1000. The speaker is located at a bottom end of the electronic device 1000. Sound emitted by the speaker may be transmitted to the outside of the electronic device 1000 from the speaker hole 1001, to implement a sound playing function of the electronic device 1000.

It should be understood that, in this embodiment of this application, orientations of the electronic device 1000 indicated by terms such as "top" and "bottom" are mainly orientations when the user uses the electronic device 1000 by hand. A position facing a top side of the electronic device 1000 is "top" and a position facing a bottom side of the electronic device 1000 is "bottom", which does not indicate or imply that the apparatus or element referred to needs to have a particular orientation, or needs to be constructed and operated in a particular orientation, and therefore shall not be construed as a limitation on the electronic device 1000 in an actual application scenario. In some embodiments, the bottom end of the electronic device 1000 is an end portion on which a headphone jack and a USB hole are disposed. The top end of the electronic device 1000 is the other end portion opposite to the end portion on which the headphone jack and the USB hole are disposed. In some embodiments, a short edge of the electronic device 1000 refers to an edge on which the top end and the bottom end of the electronic device 1000 are located, and a long edge or a side edge of the electronic device 1000 refers to an edge connected between short edges of the electronic device 1000, and may alternatively be a side edge on which a volume adjustment key and other keys are disposed.

The terms "connection" and "electrical connection" in this application usually refer to electrical connections and both include a direct connection or an indirect connection.

Figure 2:
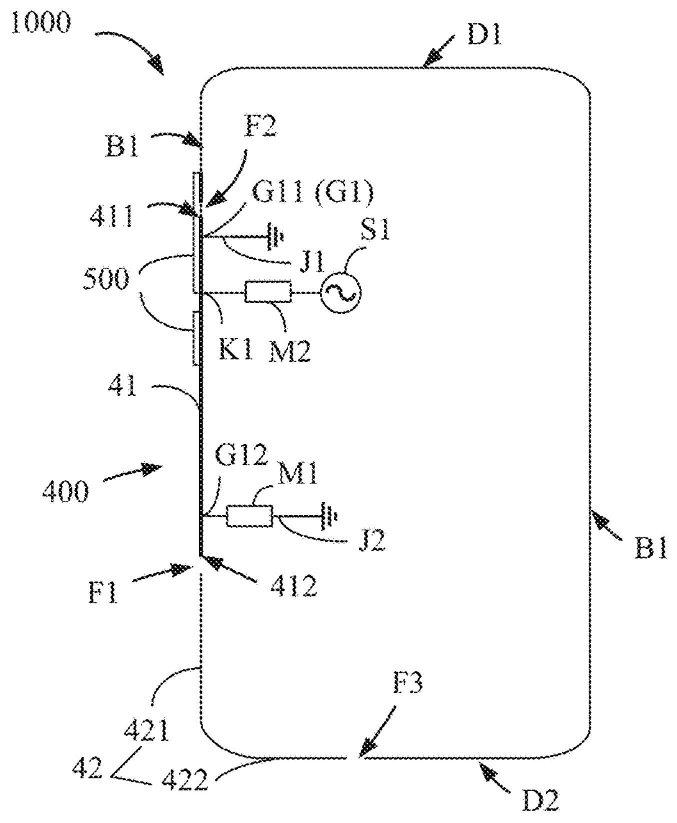
FIG. 2 is a schematic diagram of an antenna structure of an electronic device according to an embodiment of this application.

FIG. 2 is a schematic diagram of an antenna structure of an electronic device 1000 according to an embodiment of this application. As shown in FIG. 2, the electronic device 1000 includes an antenna structure 400. As shown in FIG. 2, the antenna structure 400 includes a first radiation stub 41, a second radiation stub 42, and a first feed S1. The first radiation stub 41 includes two grounding points G1 and a first feed point K1. The first feed point K1 is located between the two grounding points G1, and the two grounding points G1 are configured for grounding. The first radiation stub 41 is spaced apart from a ground connected to the two grounding points G1 to form a slot, and the first radiation stub 41 forms a slot antenna. The second radiation stub 42 has a gap F1 with the first radiation stub 41, and the second radiation stub 42 is coupled to the first radiation stub 41 through the gap F1. The first feed S1 is electrically connected to the first feed point K1 of the first radiation stub 41 and is configured to provide a first feed signal for the first radiation stub by using the first feed point K1, and couple and load the first feed signal to the second radiation stub 42 through the gap F1, so that the first radiation stub 41 and the second radiation stub 42 support transceiving of electromagnetic wave signals on a first frequency band.

Therefore, in this application, because the first radiation stub 41 forms the slot antenna, an excitation current generated after the first feed S1 provides the first feed signal for the first radiation stub 41 flows in the slot between the first radiation stub and the ground connected to the two grounding points G1, so that holding by a user has little impact on the excitation current, thereby allowing the first radiation stub 41 and the second radiation stub 42 to be arranged at parts of the electronic device 1000 that are often held by the user. Space of the electronic device 1000 can be fully utilized, so that a size of the first radiation stub 41 meets a performance requirement. In addition, a bandwidth of the first frequency band can be effectively increased by arranging the second radiation stub 42 for coupled feeding.

A resonant frequency at which the first radiation stub 41 operates under excitation of the first feed signal is a first resonant frequency, and a resonant frequency at which the second radiation stub 42 operates under excitation of the first feed signal is a second resonant frequency. The second resonant frequency is greater than the first resonant frequency, and the first frequency band includes a frequency range from the first resonant frequency to the second resonant frequency.

Therefore, resonance is performed by using the two radiation stubs. Because the first resonant frequency and the second resonant frequency are close, frequencies near the first resonant frequency and the second resonant frequency and frequencies between the first resonant frequency and the second resonant frequency are all frequencies with high resonant energy, thereby achieving good radio frequency transceiving performance. Therefore, the antenna structure 400 according to this application can well support the transceiving of the electromagnetic wave signals on the first frequency band including the frequency range from the first resonant frequency to the second resonant frequency, and effectively increase the bandwidth. The length of the second radiation stub 42 can be designed in advance based on the second resonant frequency, so that the second radiation stub 42 resonates at the second resonant frequency.

Figure 3:
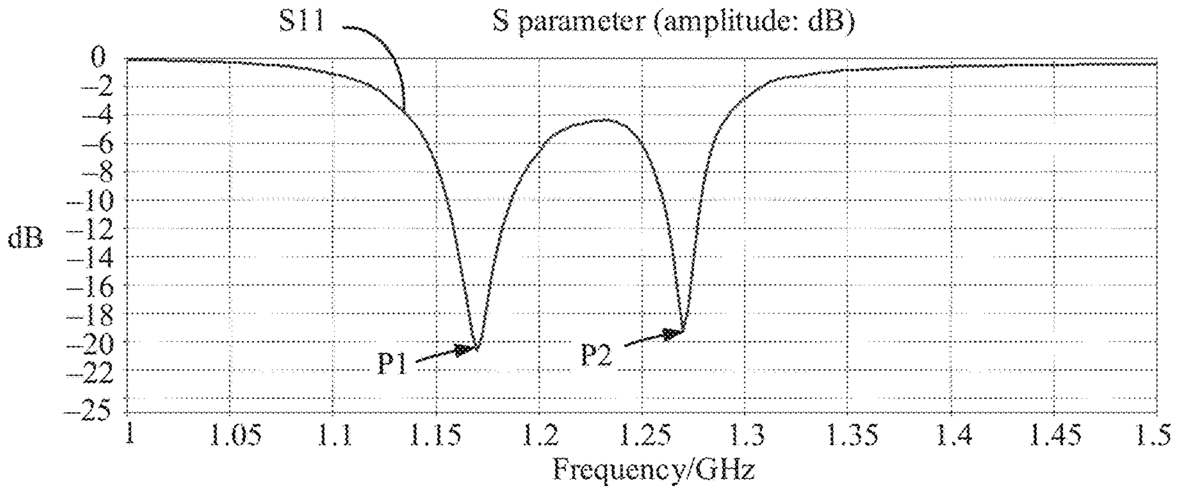
FIG. 3 is a schematic diagram of an input return loss curve of an electromagnetic wave signal generated by an antenna structure under excitation of a first feed according to an embodiment of this application.

FIG. 3 is a schematic diagram of an input return loss curve of an electromagnetic wave signal generated by the antenna structure 400 under excitation of the first feed S1. In FIG. 3, an abscissa is frequency (in GHz) and an ordinate is an input return loss, also referred to as an S parameter (in dB). The input return loss is a reflection coefficient of an electromagnetic wave signal emitted by the antenna structure 400. A lower input return loss indicates a smaller signal loss. A frequency corresponding to a valley point of the input return loss is the resonant frequency of the antenna structure 400 during operation.

As shown in FIG. 3, an input return loss curve S11 has two valley points P1 and P2, and frequencies corresponding to the two valley points P1 and P2 are 1.17 GHz and 1.27 GHz, respectively. The frequency of 1.17 GHz corresponding to the valley point P1 is the resonant frequency of the first radiation stub, that is, the first resonant frequency. The frequency of 1.27 GHz corresponding to the valley point P2 is the resonant frequency of the second radiation stub, that is, the second resonant frequency.

Therefore, it can be seen that the electromagnetic wave signal generated by the antenna structure 400 under the excitation of the first feed S1 is low in input return loss near the first resonant frequency of 1.17 GHz and is also low in input return loss near the second resonant frequency of 1.27 GHz, so that the antenna structure 400 can well operate near the first resonant frequency and the second resonant frequency.

Figure 4:
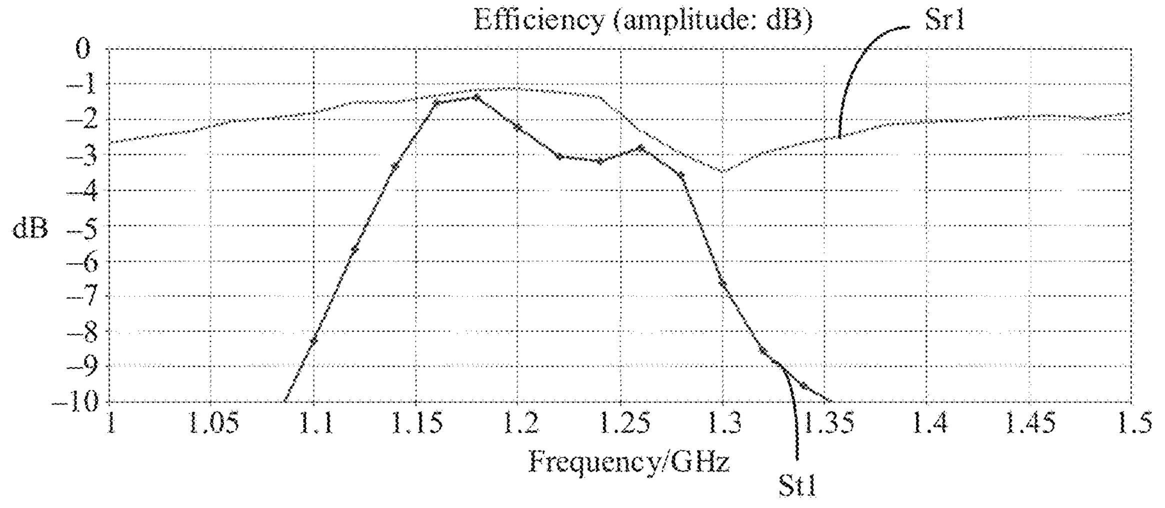
FIG. 4 is a schematic diagram of a system radiation efficiency curve and a total system efficiency curve of an electromagnetic wave signal generated by an antenna structure under excitation of a first feed according to an embodiment of this application.

FIG. 4 is a schematic diagram of a system radiation efficiency curve and a total system efficiency curve of an electromagnetic wave signal generated by the antenna structure 400 under excitation of the first feed S1. A system radiation efficiency curve Sr1 is used to reflect radiation efficiency of the electromagnetic wave signal at each frequency, and a total system efficiency curve St1 is a difference between the system radiation efficiency curve Sr1 and the input return loss curve S11. That is, a corresponding value of the total system efficiency curve St1 at each frequency is a corresponding value of the system radiation efficiency curve Sr1 at each frequency minus an S parameter value at the corresponding frequency.

It can be seen from FIG. 4 that the system radiation efficiency curve Sr1 of the electromagnetic wave signal generated by the antenna structure 400 under the excitation of the first feed S1 is relatively high on a frequency band from 1.17 GHz to 1.27 GHz, and the total system efficiency curve St1 of the electromagnetic wave signal generated by the antenna structure 400 under the excitation of the first feed S1 is also relatively high on a frequency band from 1.17 GHz to 1.27 GHz. Therefore, the antenna structure 400 can well operate on the frequency band from 1.17 GHz to 1.27 GHz under the excitation of the first feed S1.

As mentioned above, the first frequency band includes the frequency range from the first resonant frequency to the second resonant frequency, and therefore the first radiation stub and the second radiation stub can well support transceiving of electromagnetic wave signals on the first frequency band.

As can be seen from FIG. 3 and FIG. 4, S parameters, system radiation efficiency, and total system efficiency corresponding to frequencies slightly greater than the second resonant frequency and slightly less than the first resonant frequency are also high, and therefore the first frequency band can also cover frequency ranges slightly greater than the second resonant frequency and slightly less than the first resonant frequency.

Still referring to FIG. 2, the two grounding points G1 include a first grounding point G11 and a second grounding point G12. The first grounding point G11 is arranged on the first radiation stub 41 at a position close to a first end 411, and the second grounding point G12 is arranged on the first radiation stub 41 at a position close to a second end 412. The first end 411 is an end of the first radiation stub 41 away from the second radiation stub 42, and the second end 412 is an end of the first radiation stub 41 adjacent to the second radiation stub 42. The antenna structure 400 further includes a first matching circuit M1. The first grounding point G11 is directly grounded, and the second grounding point G12 is grounded by using the first matching circuit M1. The first grounding point G11 is arranged on the first radiation stub 41 at a position close to the first end 411, which refers to that the first grounding point G11 is arranged at the first end 411 of the first radiation stub 41 or near the first end 411; and the second grounding point G12 is arranged on the first radiation stub 41 at a position close to the second end 412, which refers to that the second grounding point G12 is arranged at the second end 412 of the first radiation stub 41 or near the second end 412.

In this application, the direct grounding means grounding without a matching circuit.

Therefore, the second grounding point G12 is grounded by using the first matching circuit M1, so that an operating frequency of the slot antenna formed by the first radiation stub 41 can be matched and adjusted, and the resonant frequency of the first radiation stub 41 can be adjusted to the first resonant frequency more accurately.

The input return loss curve S11 shown in FIG. 3, and the system radiation efficiency curve Sr1 and the total system efficiency curve St1 shown in FIG. 4 can all be curves obtained by simulation test of the aforementioned antenna structure 400 shown in FIG. 2.

Figure 5:
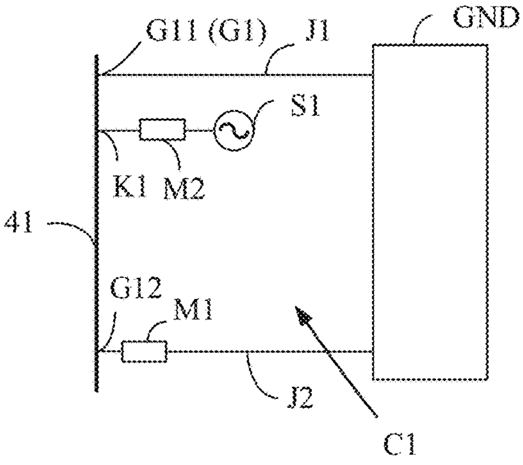
FIG. 5 is a schematic diagram of a slot antenna formed by a first radiation stub according to an embodiment of this application.

FIG. 5 is a schematic diagram of a slot antenna formed by a first radiation stub 41 according to an embodiment of this application. As shown in FIG. 5, specifically, the first grounding point G11 may be grounded by using a first connecting member J1, and the second grounding point G12 is grounded by using the first matching circuit M1 and a second connecting member J2, so that a part of the first radiation stub 41 located between the first grounding point G11 and the second grounding point G12, the first connecting member J1 for connecting the first grounding point G11 to a ground GND, the first matching circuit M1, the second connecting member, and the ground GND form a closed annular slot C1, thereby forming the slot antenna.

The first connecting member J1 for connecting the first grounding point G11 to the ground GND may be a conductive wire, a PFC (flexible printed circuit), a metal elastic piece, a solder, or the like, and the second connecting member J2 for connecting the first matching circuit M1 to the ground GND may alternatively be a conductive wire, a PFC (flexible printed circuit), a metal elastic piece, a solder, or the like. The first connecting member J1 and the second connecting member J2 may be the same or different.

In some embodiments, the first connecting member J1 may alternatively be an extension extending from the first grounding point G11 of the first radiation stub 41 to the ground GND, and forms an integrated structure with the first radiation stub 41, that is, the first connecting member is formed by processing from the first radiation stub 41.

The ground GND in this application may be specifically a metal structure ground or a mainboard ground. That is, the ground GND may be of a metal ground structure formed by processing a metal structure, or may be a whole machine ground on a mainboard in the electronic device 1000, for example, a ground region or a ground layer on the mainboard. The mainboard may be the aforementioned circuit board 300. The metal ground structure may be in a position that can be held by the user, and is connected to the ground when being held by the user, to implement final grounding of the whole machine. The mainboard ground is finally connected to the metal structure ground to implement final grounding.

Figure 6:
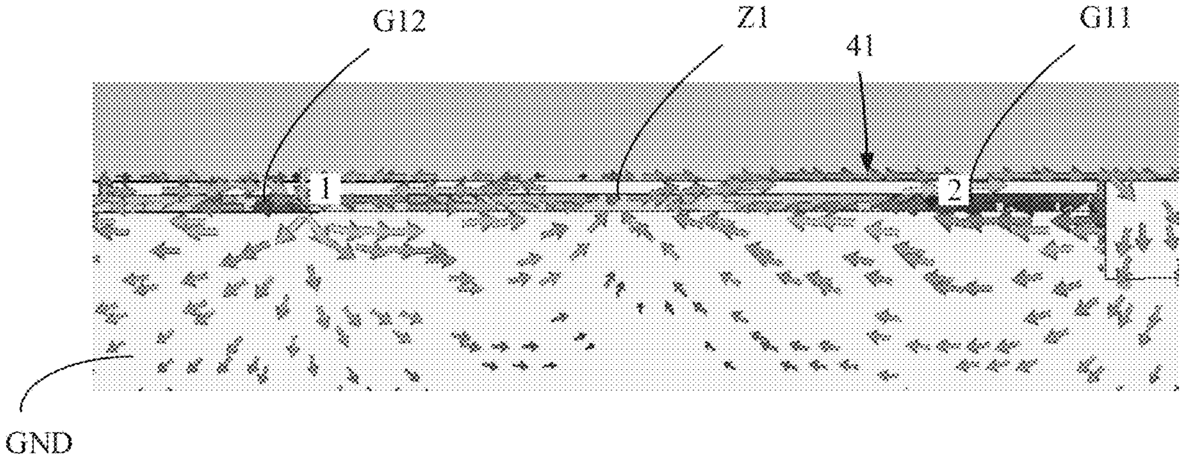
FIG. 6 is a schematic diagram showing a current distribution of a first radiation stub according to an embodiment of this application.

FIG. 6 is a schematic diagram showing a current distribution of a first radiation stub 41 according to an embodiment of this application. Specifically, FIG. 6 is a diagram showing a current distribution of an excitation current generated by exciting the first radiation stub 41 when the first feed S1 provides a feed signal for the first radiation stub 41. As shown in FIG. 6, when the first feed S1 provides the feed signal for the first radiation stub 41, the current of the first radiation stub 41 is mainly distributed in the aforementioned annular slot C1, that is, the current is mainly distributed at a part between the first grounding point G11 and the second grounding point G12 of the first radiation stub 41 and a corresponding ground GND part.

In some embodiments, a distance between the first grounding point G11 and the second grounding point G12 is ½ of a wavelength corresponding to the first resonant frequency. The distance between the first grounding point G11 and the second grounding point G12 is also an electrical length of the first radiation stub 41, and the electrical length of the first radiation stub 41 corresponds to half a cycle of a signal with the first resonant frequency at which the first radiation stub 41 operates. A peak of the electric field distribution is roughly located in the middle of the first radiation stub 41.

From the perspective of current distribution, the first grounding point G11 and the second grounding point G12 are the two points with higher currents, and a midpoint Z1 between the first grounding point G11 and the second grounding point G12 on the first radiation stub 41 is a point with a lower current. In FIG. 6, darker-colored points are points with higher currents, and lighter-colored points are points with lower currents. On the first radiation stub 41, the current flows from the midpoint Z1 to the first grounding point G11 and the second grounding point G12, flows back to a position that is in the ground GND and corresponds to the midpoint Z1 after flowing from the first grounding point G11 to the ground GND, and flows back to a position that is in the ground GND and corresponds to the midpoint Z1 after flowing from the second grounding point G12 to the ground GND. Therefore, by stabilizing in the current distribution state mentioned above, an electromagnetic wave signal with a resonant frequency being the first resonant frequency can be generated (or received) by excitation.

As shown in FIG. 6, the current of the feed signal is mainly distributed on an inner side of the first radiation stub 41 close to the ground GND and on the ground GND. Therefore, the holding by the user has little impact on the current, so that radio frequency transceiving performance of the first radiation stub 41 can still be ensured.

Figure 7:
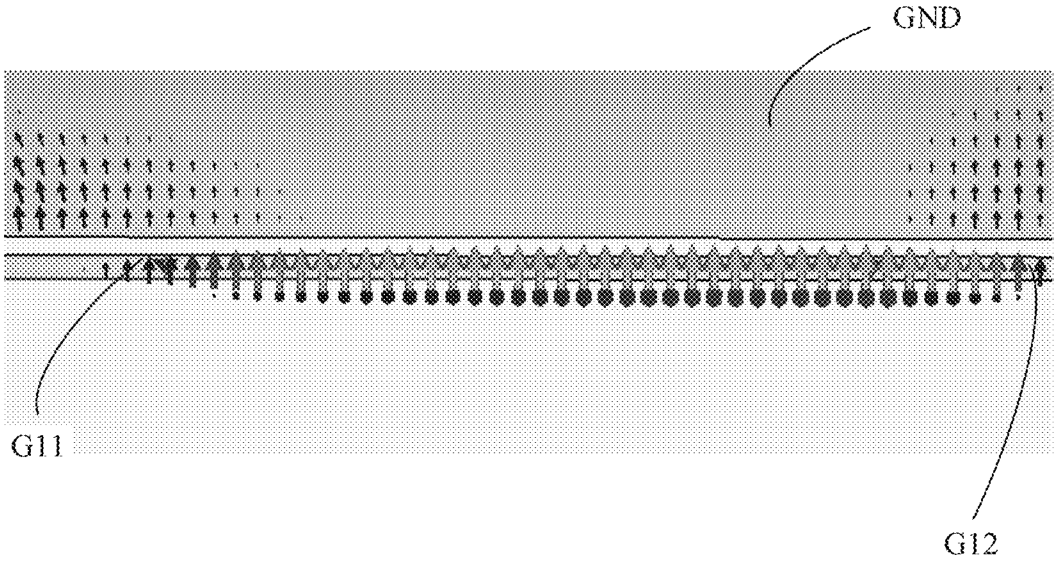
FIG. 7 is a schematic diagram showing an electric field distribution of a first radiation stub according to an embodiment of this application.

FIG. 7 is a schematic diagram showing an electric field distribution of a first radiation stub 41 according to an embodiment of this application. As mentioned above, the electrical length of the first radiation stub 41 corresponds to half a cycle of a signal with the first resonant frequency at which the first radiation stub 41 operates. A peak of the half a cycle is roughly located in the middle of the first radiation stub 41. That is, actually, a part of the first radiation stub 41 between the first grounding point G11 and the second grounding point G12 corresponds to half a cycle, and a peak of the cycle is roughly located in the middle of the first radiation stub 41. A length of each arrow in FIG. 7 represents an intensity of the electric field, and a longer arrow indicates a higher intensity of the electric field. Therefore, from the perspective of the electric field, the electric field on the first radiation stub 41 is gradually enhanced from the first grounding point G11 to the midpoint Z1, and then is gradually weakened from the midpoint Z1 to the second grounding point G12.

From the perspective of the electric field distribution, because the electric field is also mainly distributed between the first radiation stub 41 and the ground GND, that is, mainly distributed on an inner side of the electronic device 1000, the holding by the user has little impact on the electric field, so that radio frequency transceiving performance of the first radiation stub 41 can still be ensured.

The midpoint Z1 of the first radiation stub 41 between the first grounding point G11 and the second grounding point G12 is a point on the first radiation stub 41 between the first grounding point G11 and the second grounding point G12, with a same distance from the first grounding point G11 and the second grounding point G12.

In some embodiments, the first matching circuit M1 includes a matching inductor. That is, in some embodiments, the first matching circuit M1 includes an inductor, so that further tuning and matching are implemented by using the inductor, which is an inductive element, thereby effectively ensuring that the first radiation stub 41 resonates at the first resonant frequency.

In some embodiments, as shown in FIG. 2, the antenna structure further includes a second matching circuit M2, and the first feed S1 is electrically connected to the feed point K1 of the first radiation stub 41 by using the second matching circuit M2. Therefore, a feed signal of the first feed S1 is matched and adjusted by using the second matching circuit M2, so that the resonant frequency of the first radiation stub 41 can be further adjusted to the first resonant frequency more accurately.

The second matching circuit includes a plurality of matching elements, and the plurality of matching elements include at least one of an inductor and a capacitor. Specifically, the plurality of matching elements included in the second matching circuit form a matching network, so that the second matching circuit includes the matching network composed of the plurality of matching elements, and more accurate and finer adjustment can be implemented by using the matching network composed of the plurality of matching elements.

As shown in FIG. 2, the second radiation stub 42 is suspended, that is, the second radiation stub is neither grounded nor connected to another feed, and a length of the second radiation stub 42 is ½ of a wavelength corresponding to the second resonant frequency. That is, in some embodiments, when the second radiation stub 42 is suspended, the length of the second radiation stub 42 is ½ of the wavelength corresponding to the second resonant frequency, so that resonance at the second resonant frequency can be implemented.

Figure 8:
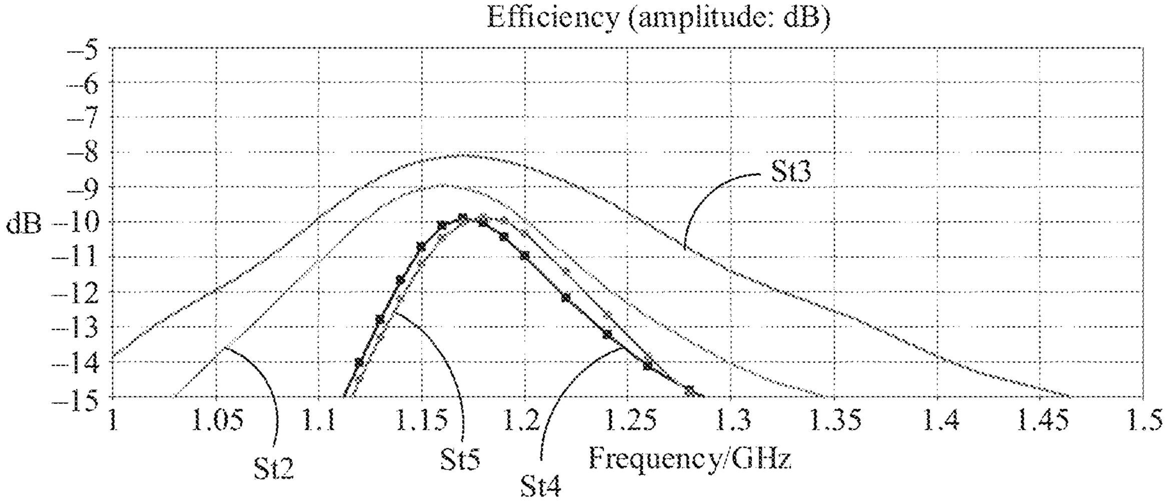
FIG. 8 is a diagram of a total system efficiency curve of a first radiation stub and an ordinary IFA in different holding cases according to an embodiment of this application.

FIG. 8 is a diagram of a total system efficiency curve of a first radiation stub 41 and an ordinary IFA (inverted F antenna) in different holding cases according to an embodiment of this application. FIG. 8 specifically illustrates a total system efficiency curve St2 when an antenna structure using a first radiation stub 41 in the form of a slot antenna is held by the user in a left hand, a total system efficiency curve St3 when the antenna structure using the first radiation stub 41 in the form of a slot antenna is held by the user in a right hand, a total system efficiency curve St4 when an antenna structure using an IFA in the prior art is held by the user in the left hand, and a total system efficiency curve St5 when the antenna structure using the IFA in the prior art is held by the user in the right hand.

As can be seen from FIG. 8, total system efficiency when the antenna structure using the first radiation stub 41 in the form of a slot antenna in this application is held by the user in the left hand and when the same is held by the user in the right hand is obviously better than total system efficiency when the antenna structure using the IFA is held by the user in the left hand and when the same is held by the user in the right hand.

Figure 9:
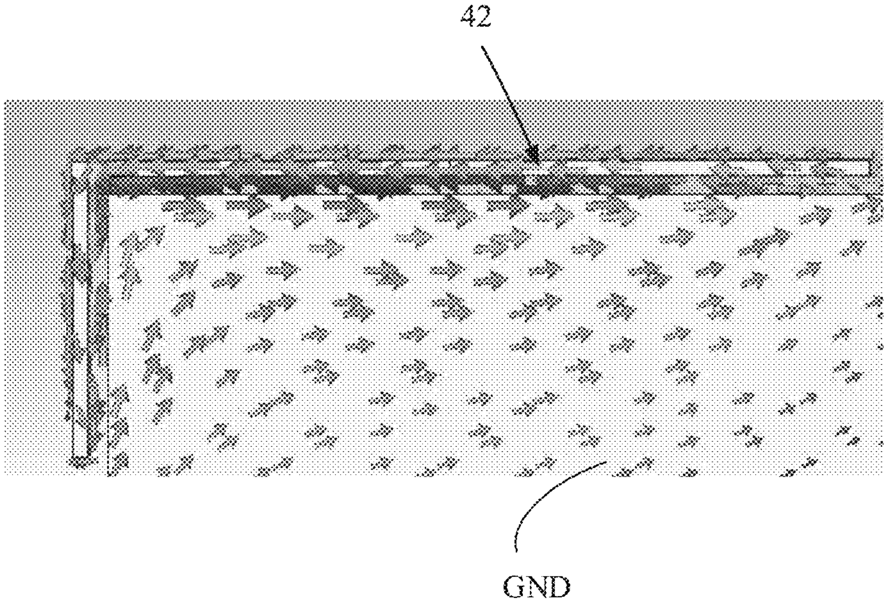
FIG. 9 is a schematic diagram showing a current distribution of a second radiation stub according to an embodiment of this application.

FIG. 9 is a schematic diagram showing a current distribution of a second radiation stub 42 according to an embodiment of this application. FIG. 8 is specifically a schematic diagram showing a current distribution of an excitation current generated by exciting the second radiation stub 42 when a first feed signal of the first feed S1 is coupled to the second radiation stub 42 through the gap F1.

As shown in FIG. 9, a current value of the second radiation stub 42 is relatively large at a middle part of the second radiation stub 42, and the second radiation stub 42 can be further coupled to the ground GND at a corresponding position to generate a reverse current. The first feed signal of the first feed S1 is an alternating current signal, and a direction of the current of the second radiation stub 42 periodically changes based on the first feed signal. Therefore, the second radiation stub can be effectively excited and resonate at the aforementioned second resonant frequency. Therefore, in addition to including the aforementioned first radiation stub 41 and related feed thereof, and a grounding structure, the antenna structure 400 according to this application further includes the second radiation stub 42, which can effectively increase the bandwidth.

Figure 10:
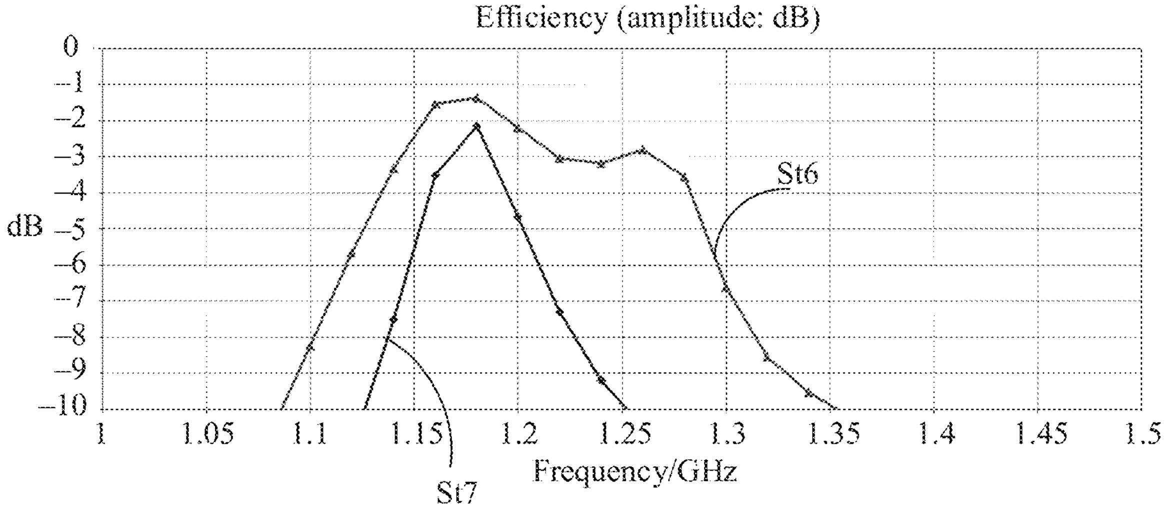
FIG. 10 is a diagram of total system efficiency curves of an antenna structure according to an embodiment of this application when the structure includes both a first radiation stub and a second radiation stub and when the structure includes only a first radiation stub.

FIG. 10 is a diagram of total system efficiency curves of an antenna structure according to an embodiment of this application when the structure includes both a first radiation stub 41 and a second radiation stub 42 and when the structure includes only a first radiation stub 41. That is, FIG. 10 illustrates a total system efficiency curve St6 of an antenna structure when the structure includes both the first radiation stub 41 and the second radiation stub 42, and a total system efficiency curve St7 of an antenna structure when the structure includes only the first radiation stub 41.

As can be seen from FIG. 10, the total system efficiency corresponding to each frequency on an operable frequency band range of the total system efficiency curve St6 is obviously greater than the total system efficiency in the total system efficiency curve St7. Therefore, as can be seen from the total system efficiency, after the second radiation stub 42 is further included, the total system efficiency is obviously improved, thereby effectively improving antenna performance.

FIG. 10 is a schematic diagram showing an overall current distribution of an antenna structure 400 according to an embodiment of this application. FIG. 10 is actually a combination of the diagram showing a current distribution of the first radiation stub 41 shown in FIG. 6 and the diagram showing a current distribution of the second radiation stub 42 shown in FIG. 9.

As can be seen from FIG. 10, both the first radiation stub 41 and the second radiating stub 42 have large current regions, and therefore can be effectively excited to be at the corresponding first resonant frequency and second resonant frequency respectively. Due to the feeding of the second radiation stub 42 through coupling, the two resonant frequencies, namely the first resonant frequency and the second resonant frequency, are close, and therefore frequencies near the first resonant frequency and the second resonant frequency and frequencies between the first resonant frequency and the second resonant frequency are all frequencies with high resonant energy, thereby achieving good radio frequency transceiving performance. Therefore, the antenna structure 400 according to this application can well support the transceiving of the electromagnetic wave signals on the first frequency band including the frequency range from the first resonant frequency to the second resonant frequency.

Figure 11:
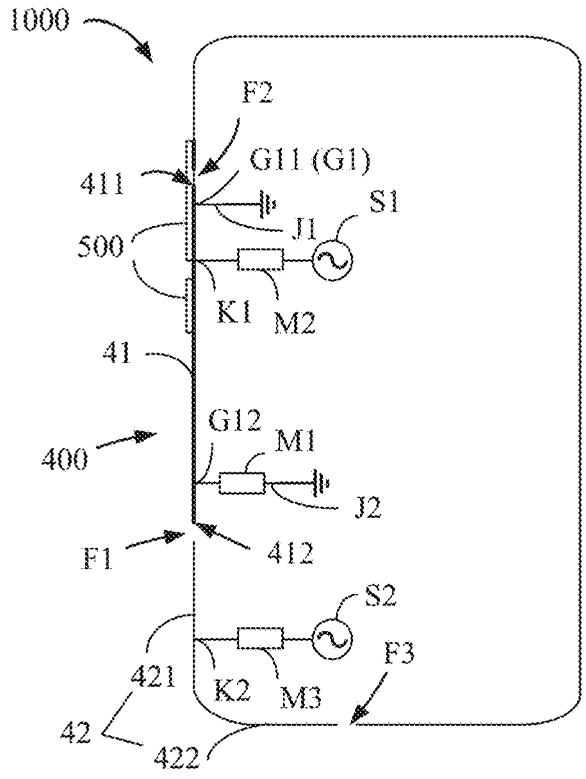
FIG. 11 is a first schematic example diagram of an antenna structure according to some other embodiments of this application.

FIG. 11 is a first schematic example diagram of an antenna structure according to some other embodiments of this application. As shown in FIG. 11, in some other embodiments, the second radiation stub 42 includes a second feed point K2, and the antenna structure 400 further includes a second feed S2 and a third matching circuit M3. The second feed S2 is connected to the second feed point K2 by using the third matching circuit M3, and provides a second feed signal for the second radiation stub 42, to excite the second radiation stub to operate on a second frequency band.

That is, in some embodiments, the second radiation stub 42 may be further additionally connected to the second feed S2, to operate on the second frequency band under the excitation of the second feed signal provided by the second feed S2. Therefore, the second radiation stub 42 can not only be configured to operate at the second resonant frequency and nearby frequencies on the first frequency band under the excitation of the first feed signal to support transceiving of electromagnetic wave signals with some frequencies on the first frequency band, but also operate on the second frequency band under the excitation of the second feed signal to support transceiving of electromagnetic wave signals on the second frequency band, thereby effectively improving the frequency band of the multi-antenna structure and further increasing the bandwidth.

In some embodiments, the second frequency band and the first frequency band do not overlap at all, that is, they do not have the same frequency range, so that the first frequency band and the second frequency band do not interfere with each other, and the second radiation stub 42 can operate at some frequencies on the first frequency band and can also operate on the second frequency band.

The second feed S2 is connected to the second feed point K2 by using the third matching circuit M3, so as to be connected to the second radiation stub 42, to form a T-shaped antenna with the second radiation stub 42.

The third matching circuit M3 also includes a plurality of matching elements, and the plurality of matching elements include at least one of an inductor and a capacitor. Specifically, the plurality of matching elements also form a matching network, so that the third matching circuit M3 can be adjusted more accurately and finely by using the matching network composed of the plurality of matching elements.

In this application, the first feed point K1 may be located at any position between the first grounding point G11 and the second grounding point G12 on the first radiation stub 41. The second feed point K2 may be located at any position on the second radiation stub 42.

Figure 12:
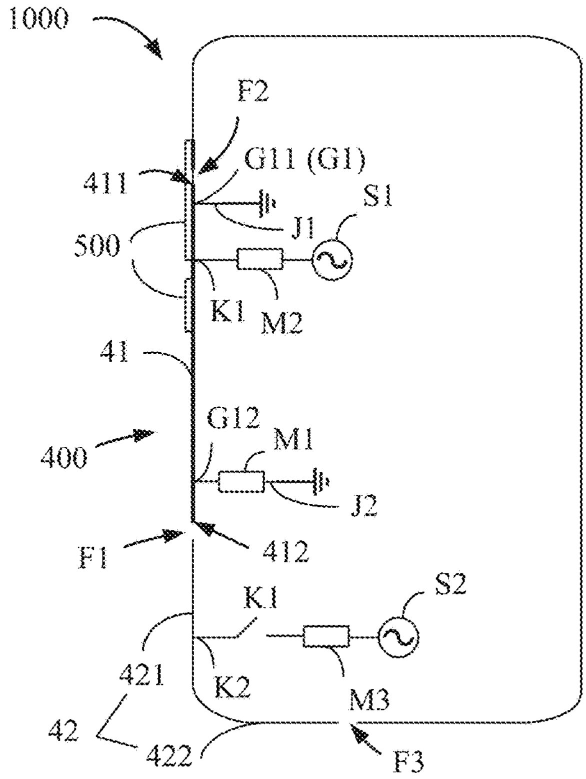
FIG. 12 is a second schematic example diagram of an antenna structure according to some other embodiments of this application.

FIG. 12 is a second schematic example diagram of an antenna structure according to some other embodiments of this application. As shown in FIG. 12, in some embodiments, the antenna structure further includes a switch SW1, and the switch SW1 is connected between the third matching circuit M3 and the second feed point K2. The switch SW1 is configured to be off when the antenna structure 400 operates on the first frequency band. In this example, the second frequency band partially overlaps the first frequency band.

That is, in some embodiments, the second frequency band partially overlaps the first frequency band, and the antenna structure further includes a switch SW1, which is configured to be off when the antenna structure 400 operates on the first frequency band, so as to effectively ensure quality of electromagnetic wave signals in the first frequency band and avoid interference from the second frequency band.

Obviously, when the second frequency band does not overlap the first frequency band at all, the switch SW1 may alternatively be arranged, and is off when the antenna structure 400 operates on the first frequency band, thereby effectively ensuring that the antenna structure 400 is subjected to no crosstalk from another frequency band when operating on the first frequency band.

In some embodiments, a length of the second radiation stub 42 is ½ of a wavelength corresponding to the second resonant frequency. That is, in some embodiments, when the second radiation stub 42 is electrically connected to the second feed S2, the length of the second radiation stub 42 is ½ of the wavelength corresponding to the second resonant frequency, so that the second radiation stub can resonate at the second resonant frequency, and operate on the second frequency band S2 under the excitation of the second feed signal of the second feed. In this application, the length of the second radiation stub 42 may also refer to an electrical length.

Figure 13:
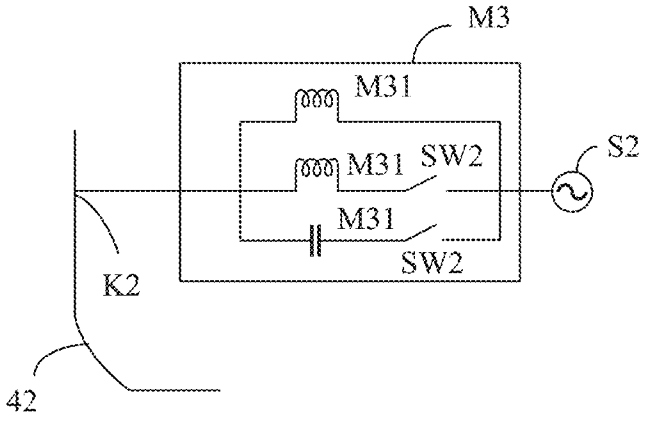
FIG. 13 is a schematic diagram of a specific structure of a third matching circuit according to an embodiment of this application.

FIG. 13 is a schematic diagram of a specific structure of a third matching circuit M3 according to an embodiment of this application. As shown in FIG. 13, the third matching circuit M3 includes a plurality of matching elements M31 and at least one matching switch SW2. At least one of the plurality of matching elements M31 is connected in series to a matching switch SW2, and the matching switch SW2 is configured to switch an on or off state when the antenna structure 400 operates on the first frequency band, so as to adjust an operating frequency of the second radiation stub 42.

The operating frequency of the second radiation stub 42 under the excitation of the second feed S2 can be adjusted, by switching the on or off state of the matching switch SW2, to a frequency on the second frequency band that does not overlap the first frequency band, so that the operating frequency of the second radiation stub is different from frequencies on the first frequency band, and the quality of the electromagnetic wave signals on the first frequency band can also be effectively ensured.

The plurality of matching elements M31 may include an inductor, a capacitor, and other elements. The plurality of matching elements M31 are electrically connected in parallel between the second feed S2 and the second radiation stub 42. When a matching element M31 is connected in series to a matching switch SW2, a series branch of the matching element M31 and the matching switch SW2 is electrically connected in parallel to another matching element M31 or another series branch between the second feed S2 and the second radiation stub 42. Therefore, a quantity and/or type of matching elements M31 that participate in matching and adjustment and that are in the third matching circuit M3 can be changed by switching the on or off state of the matching switch SW2, so that the operating frequency of the second radiation stub 42 under the excitation of the second feed S2 can be adjusted. The matching switch(es) SW2 with the on or off state switched may be some or all of the at least one matching switch SW2.

As shown in FIG. 13, a quantity of the at least one matching switch SW2 is less than a quantity of the plurality of matching elements M31. Obviously, in other embodiments, the quantity of the at least one matching switch SW2 may alternatively be equal to the quantity of the plurality of matching elements M31, that is, each matching element M31 is connected in series to a matching switch SW2. When the quantity of the at least one matching switch SW2 is equal to the quantity of the plurality of matching elements M31, after the on or off state of the matching switch SW2 is switched, at least one matching switch SW2 is in an on state.

Figure 14:
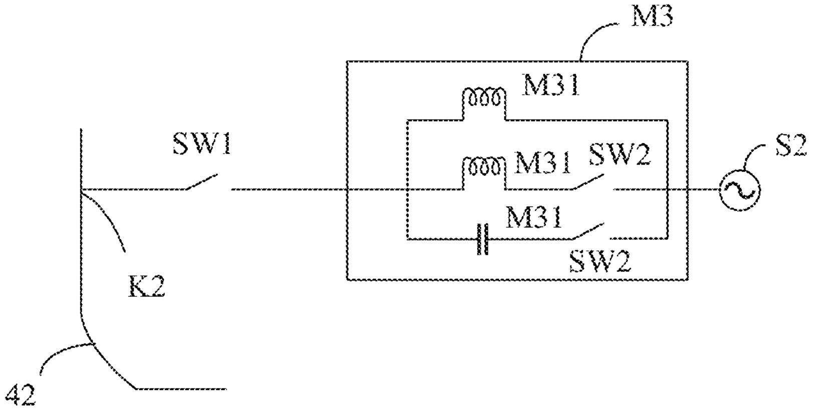
FIG. 14 is a schematic diagram of an overall structure with a second feed connected to a second radiation stub according to some embodiments of this application.

FIG. 14 is a schematic diagram of an overall structure with a second feed S2 connected to a second radiation stub 42 according to some other embodiments of this application.

In some other embodiments, the antenna structure includes a switch SW1, and the switch SW1 is connected between the third matching circuit M3 and the second feed point K2. In addition, the third matching circuit M3 includes a plurality of matching elements M31 and at least one matching switch SW2. At least one of the plurality of matching elements M31 is connected in series to a matching switch SW2.

In some other embodiments, the switch SW1 is configured to be off when the antenna structure 400 operates on the first frequency band and interference received by the first frequency band is greater than a first threshold, and the matching switch SW2 is configured to switch an on or off state when the antenna structure 400 operates on the first frequency band and interference received by the first frequency band is greater than a second threshold and less than the first threshold. The second threshold is less than the first threshold.

That is, in some other embodiments, the switch SW1 or the matching switch SW2 may be controlled based on a degree of interference received by the first frequency band. When the antenna structure 400 operates on the first frequency band and the interference received by the first frequency band is greater than the first threshold, the interference is large, and a feed path of the second feed S2 may be disconnected by directly controlling the switch SW1 to be off, so that the interference to the first frequency band can be effectively avoided. When the antenna structure 400 operates on the first frequency band and the interference received by the first frequency band is greater than the second threshold and less than the first threshold, the matching switch SW2 is controlled to switch the on or off state, so that the operating frequency of the second radiation stub 42 under the excitation of the second feed S2 can be adjusted to a frequency on the second frequency band that does not overlap the first frequency band, so that the operating frequency of the second radiation stub is different from frequencies on the first frequency band, and the quality of the electromagnetic wave signals on the first frequency band can also be effectively ensured. Moreover, in this case, the frequency at which of the second feed S2 excites the second radiation stub 42 is maintained, and the bandwidth can be effectively increased.

In this application, the matching switch SW2 switches the on or off state, which means that the matching switch SW2 is switched to an off state when currently in an on state, or is switched to an on state when currently in an off state.

Figure 15:
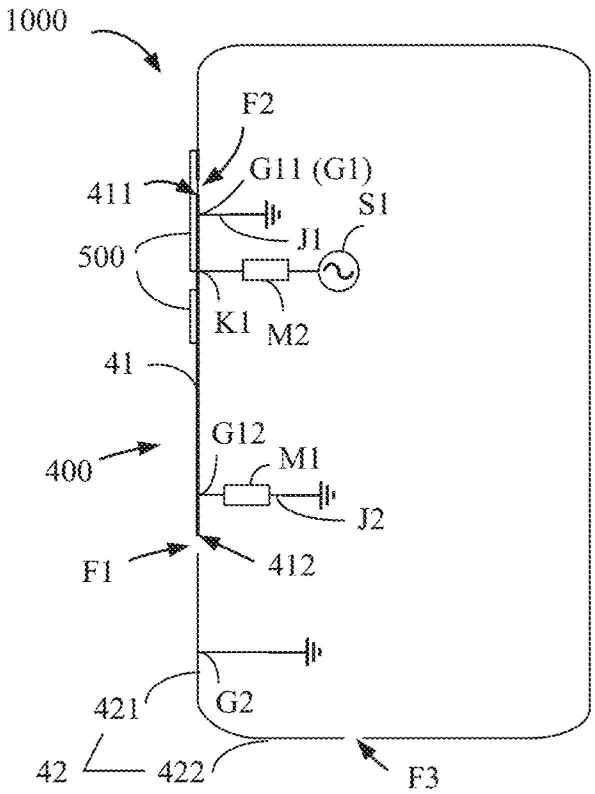
FIG. 15 is a schematic diagram of an antenna structure according to still some other embodiments of this application.

FIG. 15 is a schematic diagram of an antenna structure according to still some other embodiments of this application. As shown in FIG. 15, in some embodiments, the second radiation stub 42 includes a third grounding point G2, the third grounding point G2 is configured for grounding, and a length of a part of the second radiation stub that is located between the third grounding point G2 and the gap F1 is ¼ of a wavelength corresponding to the second resonant frequency.

That is, in some embodiments, the second radiation stub 42 may be grounded by using the third grounding point G2. In this case, the length of the part of the second radiation stub that is located between the third grounding point G2 and the gap F1 only needs to be ¼ of the wavelength corresponding to the second resonant frequency. Therefore, the third grounding point G2 may be arranged for grounding, which can effectively shorten the length of the second radiation stub 42 and save space. In this application, the length of the part of the second radiation stub that is located between the third grounding point G2 and the gap F1 may also refer to an electrical length.

After the first feed signal generated by the first feed S1 is coupled to the second radiation stub 42 through the gap F1, the excitation current generated by exciting the second radiation stub 42 further passes through the third grounding point G2 to the ground GND and then continues to flow back for a certain distance. The distance is roughly equivalent to ¼ of the wavelength corresponding to the second resonant frequency. Therefore, the overall length/electrical length of the second radiation stub 42 grounded by using the third grounding point G2 can be ½ of the wavelength corresponding to the second resonant frequency, and therefore the second radiation stub can still resonate well at the second resonant frequency.

The third grounding point G2 may alternatively be connected to the ground GND by using a connecting member such as a conductive wire, an FPC, a metal elastic piece, or a solder to be grounded.

In some embodiments, the first frequency band in this application includes a GPS L5 frequency band. That is, in this application, the antenna structure 400 including the first radiation stub 41 and the second radiation stub 42 can specifically implement transceiving of electromagnetic wave signals on a frequency band including the GPS L5 frequency band.

In the prior art, due to a large size required for an antenna in the GPS L5 frequency band, if the antenna is arranged at an upper half part of an electronic device close to a top end together with other antennas, the required size often cannot be achieved because of a small clearance area and more antennas, which often affects the antenna performance. In this application, because the first radiation stub 41 forms the slot antenna, an excitation current generated after the first feed S1 provides the first feed signal for the first radiation stub 41 flows in the slot between the first radiation stub and the ground connected to the two grounding points G1, so that holding by the user has little impact on the excitation current, thereby allowing the antenna structure 400 implementing the GPS L5 frequency band to be arranged at parts of the electronic device 1000 that are often held by the user, to meet requirements for the antenna size by the GPS L5 frequency band and improve performance.

Still referring to FIG. 2, the electronic device 1000 includes a top end D1, a bottom end D2, and a side edge B1 located between the top end D1 and the bottom end D2. As shown in FIG. 2, the first radiation stub 41 is arranged on the side edge B1 of the electronic device 1000, the second radiation stub 42 extends and is arranged on the side edge B1 and the bottom end D2 of the electronic device 1000, and the second radiation stub 42 is away from the top end D1 relative to the first radiation stub 41. That is, when the antenna structure 400 is installed in the electronic device 1000, the first radiation stub 41 is arranged on the side edge B1 of the electronic device 1000, and the second radiation stub 42 extends and is arranged on the side edge B1 and the bottom end D2 of the electronic device 1000 at which the first radiation stub 41 is arranged. That is, a part of the second radiation stub 42 is arranged on the side edge B1 on which the first radiation stub 41 is arranged, and the other part thereof is arranged at the bottom end D2.

Therefore, the first radiation stub 41 and the second radiation stub 42 are arranged on the side edge B1, a part of the side edge close to the bottom end D2, and the bottom end D2 of the electronic device 1000. The part of the side edge B1 close to the bottom end D2 and the bottom end D2 of the electronic device 1000 are usually parts of the electronic device 1000 that are often held by the user. Therefore, according to this application, the first radiation stub 41 is arranged on the side edge B1 of the electronic device 1000, and the second radiation stub 42 extends and is arranged on the side edge B1 and bottom end D2 of the electronic device 1000, that is, the first radiation stub 41 and the second radiation stub 42 are arranged at parts of the electronic device 1000 that are often held by the user. The antenna structure 400 according to this application allows the first radiation stub and the second radiation stub to be arranged at the parts often held by the user. Therefore, the space can be fully used to meet requirements for sizes of radiation stubs, and the antenna performance is prevented from being affected by the holding by the user.

As shown in FIG. 2, the gap F1 between the first radiation stub 41 and the second radiation stub 42 is provided in the side edge B1. Obviously, in other embodiments, the gap F1 between the first radiation stub 41 and the second radiation stub 42 may alternatively be provided in the bottom end D2. In other embodiments, the first radiation stub 41 may extend to a position close to the bottom end D2, and the second radiation stub 42 may be entirely arranged at the bottom end D2.

As shown in FIG. 2, in some embodiments, the first radiation stub 41 is located on the side edge B1 of the electronic device 1000 and has a preset distance from the top end of the electronic device 1000, and the first radiation stub 41 is elongated. The second radiation stub 42 includes a first sub-stub 421 and a second sub-stub 422, and the first sub-stub 421 is arranged at an included angle with the second sub-stub 422. The first sub-stub 421 is adjacent to the first radiation stub 41 to have the gap F1 with the first radiation stub 41, and the first sub-stub 421 is parallel to the first radiation stub 41. The first sub-stub 421 of the second radiation stub 42 is located on the side edge B1 of the electronic device 1000 at a position close to the bottom end D2, and the second sub-stub 422 of the second radiation stub 42 is located at the bottom end D2 of the electronic device 1000. That is, when the antenna structure 400 is installed in the electronic device 1000, the first radiation stub 41 is located on the side edge B1 of the electronic device 1000, the first sub-stub 421 of the second radiation stub 42 is located on the side edge B1 of the electronic device 1000 at a position close to the bottom end D2, and the second sub-stub 422 of the second radiation stub 42 is located at the bottom end D2 of the electronic device 1000.

In some embodiments, as shown in FIG. 2, the first sub-stub 421 and the second sub-stub 422 are located on the side edge B1 and the bottom end D2 respectively, and are approximately perpendicular to each other, and an included angle between the first sub-stub 421 and the second sub-stub 422 is approximately 90°. As shown in FIG. 2, the first sub-stub 421 and the second sub-stub 422 are connected to each other in arc transition.

A preset distance between the first radiation stub 41 and the top end of the electronic device 1000 may be a value of ⅕-½ of a length of the side edge B1 of the electronic device 1000.

In some embodiments, the first radiation stub 41 may be specifically arranged in the middle of the side edge B1, that is, a distance between the first radiation stub 41 and the top end D1 and a distance between the first radiation stub 41 and the bottom end D2 may be approximately equal.

Therefore, with the above structure, the antenna structure can be arranged by making full use of the side edge and the bottom end where the antenna would not be arranged originally, thereby making full use of the space of the electronic device 1000, and antenna performance is not affected by the holding by the user, thereby effectively improving the antenna performance.

FIG. 2 and FIG. 11 to FIG. 13 are schematic diagrams illustrating an internal structure of the antenna structure 400 when viewed from a back face of the electronic device 1000, that is, from a surface facing away from the display module 200, that is, these figures are schematic diagrams illustrating an internal structure of the antenna structure 400 when viewed from a side of the back cover 120 of the electronic device 1000

Figure 16:
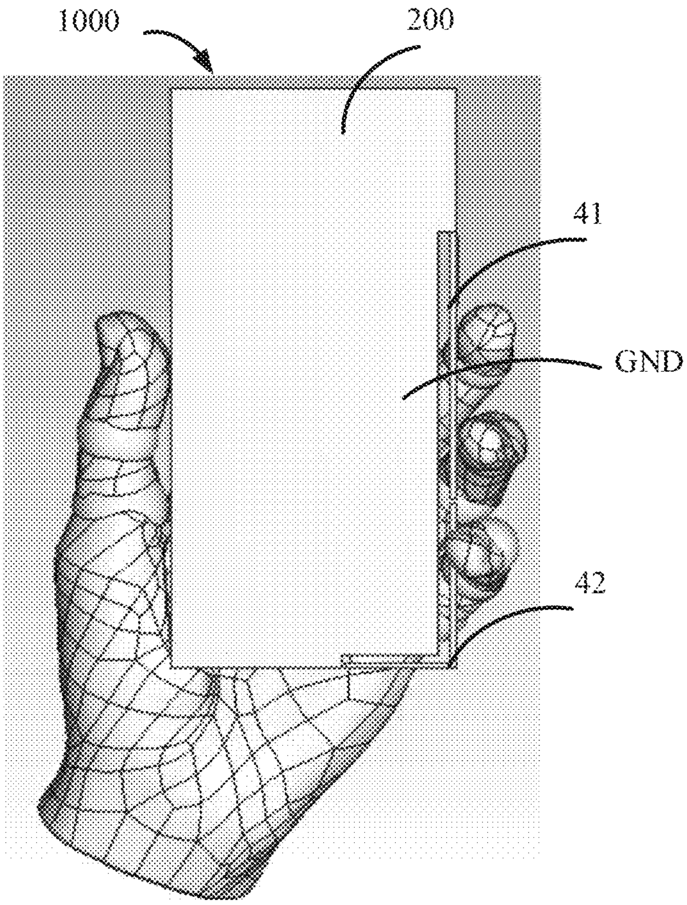
FIG. 16 is a schematic diagram of an electronic device held in a left hand according to an embodiment of this application.
Figure 17:
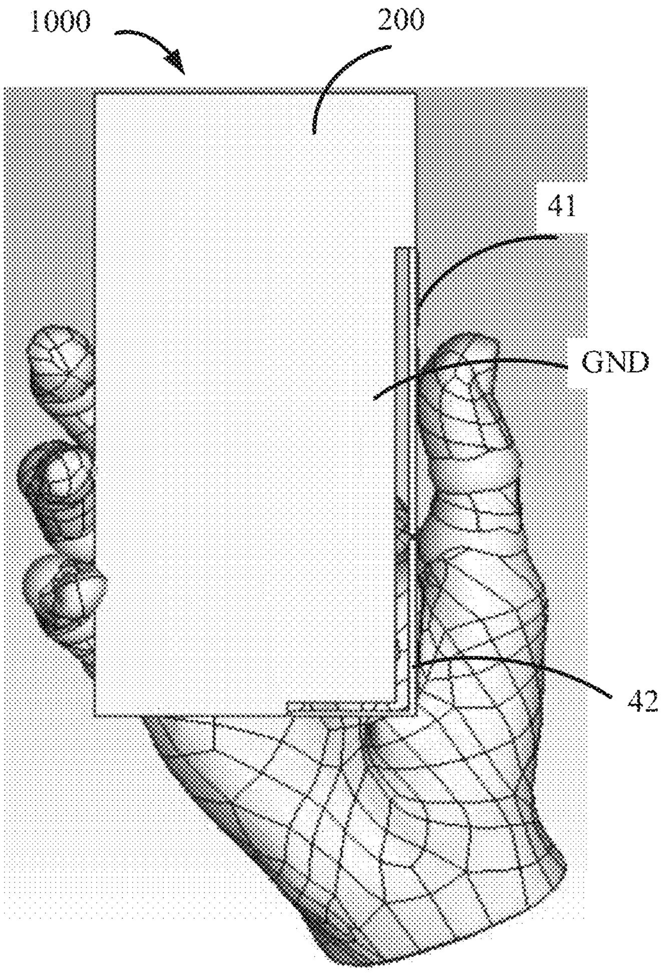
FIG. 17 is a schematic diagram of an electronic device held in a right hand according to an embodiment of this application.

FIG. 16 and FIG. 17 are schematic diagrams of the electronic device 1000 when it is held in a left hand and when it is held in a right hand. FIG. 16 and FIG. 17 are schematic diagrams as viewed from the front face of the electronic device 1000, that is, from a surface of the display module 200.

As shown in FIG. 16 and FIG. 17, both the first radiation stub 41 and the second radiation stub 42 of the antenna structure are partially held by the user when the electronic device 1000 is held by the user in the left hand and when the electronic device 1000 is held by the user in the right hand. That is, the first radiation stub 41 and the second radiation stub 42 may be arranged at parts of the electronic device 1000 that are often held by the user. With the above structure, the antenna structure can be arranged by making full use of the side edge and the bottom end where the antenna would not be arranged originally, thereby making full use of the space of the electronic device 1000, and antenna performance is not affected by the holding by the user, thereby effectively improving the antenna performance.

In the structure of the electronic device 1000 shown in FIG. 16 and FIG. 17, a ground GND is further illustrated. As mentioned above, the ground GND may be of a metal ground structure, or a ground region on a mainboard, or a ground layer of the mainboard. Gaps X1 are provided between the first radiation stub 41 and the ground GND and the second radiation stub 42 and the ground GND. The first radiation stub 41 may be connected to the ground GND by using the aforementioned first connecting member J1 and second connecting member J2 to be grounded. The second radiation stub 42 may be connected to the ground GND to be grounded or be ungrounded to be in a suspended state.

A frequency band part required on the first frequency band in this application may be mainly provided by the first radiation stub 41, so that, for example, the aforementioned GPS L5 frequency band may be mainly a frequency range near the first resonant frequency supported by the first radiation stub 41, and the second radiation stub 42 is used to further increase the bandwidth. Therefore, although the second radiation stub 42 is not a slot antenna, as can be seen from FIG. 16 and FIG. 17, the second radiation stub 42 is not completely shielded by holding, which, compared with no arrangement of the second radiation stub 42, can effectively increase the bandwidth and improve the antenna performance.

In FIG. 2, FIG. 11 to FIG. 13, FIG. 16, and FIG. 17, it is illustrated that the first radiation stub 41 and the second radiation stub 42 are arranged on a right side edge and the bottom end D2 of the electronic device 1000, that is, on the right side edge and the bottom end D2 as viewed from the side of the display module 200 of the electronic device 1000. As shown in FIG. 2, the electronic device 1000 further includes a side edge key 500. The side edge key 500 is provided with the side edge of the electronic device 1000, especially on the right side edge of the electronic device 1000 as viewed from the side of the display module 200. Therefore, in other words, the first radiation stub 41 and the second radiation stub 42 are arranged on the side edge B1 on which the side edge key 500 is arranged and the bottom end D2.

Obviously, the first radiation stub 41 and the second radiation stub 42 may alternatively be arranged on a left side edge and the bottom end D2 of the electronic device 1000. That is, the first radiation stub 41 and the second radiation stub 42 may alternatively be arranged on the side edge B1 on which no side edge key 500 is arranged and the bottom end D2 of the electronic device 1000.

In some embodiments, the frame 110 (as shown in FIG. 1) of the electronic device 1000 is a metal frame, and the first radiation stub 41 and the second radiation stub 42 are two metal frame segments formed by providing a gap in the metal frame of the electronic device 1000.

Still referring to FIG. 2, when the first radiation stub 41 and the second radiation stub 42 are the two metal frame segments formed by providing the gap in the metal frame of the electronic device 1000, the metal frame is further provided with a gap F2 and a gap F3 in addition to being provided with the gap F1 between the first radiation stub 41 and the second radiation stub 42. The gap F2 is provided at the first end 411 of the first radiation stub 41 to isolate the first radiation stub 41 from other parts of the metal frame, and the gap F3 is provided at an end of the second radiation stub 42 away from the gap F1 to also isolate the second radiation stub 42 from other parts of the metal frame.

Therefore, the metal frame is shared as a radiator, which can reduce costs, and can further save space because there is no need to additionally arrange a radiator.

In other embodiments, a frame of the electronic device 1000 is a nonmetallic frame, and the first radiation stub 41 and the second radiation stub 42 are metal segments arranged in the frame of the electronic device 1000.

That is, in other embodiments, the frame 110 of the electronic device 1000 may alternatively be a nonmetallic frame with low electrical conductivity, such as plastic or ceramic. The first radiation stub 41 and the second radiation stub 42 are metal segments arranged in the frame of the electronic device 1000.

The first radiation stub 41 and the second radiation stub 42 may be embedded in the frame of the electronic device 1000 or arranged on an inner side face of the frame of the electronic device 1000.

Therefore, in some embodiments, the frame of the electronic device 1000 may alternatively be a nonmetallic frame with low electrical conductivity, such as plastic or ceramic, which can further reduce the influence of the holding by the user on the first radiation stub 41, the second radiation stub 42, and the like.

In this application, a width of the gap F1 between the first radiation stub 41 and the second radiation stub 42 may be 0.5 mm (millimeter) to 1.5 mm. The width of the gap F1 is a distance between the first radiation stub 41 and the second radiation stub 42.

Therefore, in the antenna structure 400 and the electronic device 1000 according to this application, the radiation stubs of the antenna structure 400 can be allowed to be arranged at parts often held by the user, and the antenna performance is not affected by the holding by the user, so that the space of the electronic device 1000 can be effectively used to arrange the radiation stubs with larger sizes, thereby effectively improving the antenna performance.

Figure 18:
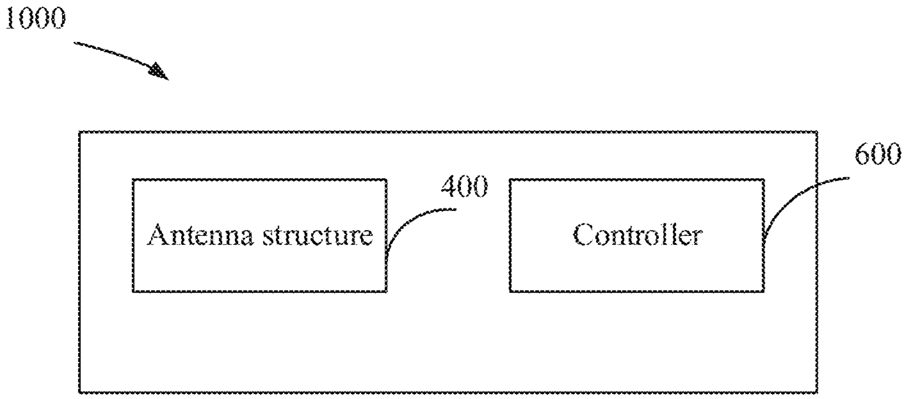
FIG. 18 is a block diagram of a structure of an electronic device according to some embodiments of this application.

FIG. 18 is a block diagram of a structure of an electronic device 1000 according to some embodiments of this application. As shown in FIG. 16, the electronic device 1000 includes the aforementioned antenna structure 400 and further includes a controller 600.

In some embodiments, the second radiation stub 42 includes a second feed point K2, and the antenna structure 400 further includes a second feed S2 and a third matching circuit M3. The second feed S2 is connected to the second feed point K2 by using the third matching circuit M3, and provides a second feed signal for the second radiation stub 42, to excite the second radiation stub to operate on a second frequency band. The antenna structure further includes a switch SW1, and the switch SW1 is connected between the third matching circuit M3 and the second feed point K2. The controller 600 is further connected to the switch SW1, to control the switch SW1 to be off when the antenna structure 400 operates on the first frequency band, and to control the SW1 to be on when the antenna structure 400 does not operate in the first frequency band.

In some embodiments, the third matching circuit M3 includes a plurality of matching elements M31 and at least one matching switch SW2, and at least one of the plurality of matching elements M31 is connected in series to a matching switch SW2. The controller 600 is further connected to the at least one matching switch SW2, and the controller 600 is configured to switch the on or off state of the matching switch SW2 when the antenna structure 400 operates on the first frequency band, so as to adjust the operating frequency of the second radiation stub 42. Therefore, the operating frequency of the second radiation stub 42 under the excitation of the second feed S2 can be adjusted, by switching the on or off state of the matching switch SW2, to a frequency on the second frequency band that does not overlap the first frequency band, so that the operating frequency of the second radiation stub is different from frequencies on the first frequency band, and the quality of the electromagnetic wave signals on the first frequency band can also be effectively ensured.

In some embodiments, the antenna structure includes a switch SW1, and the switch SW1 is connected between the third matching circuit M3 and the second feed point K2. In addition, the third matching circuit M3 includes a plurality of matching elements M31 and at least one matching switch SW2, and at least one of the plurality of matching elements M31 is connected in series to a matching switch SW2. The controller 600 is connected to both the switch SW1 and the at least one matching switch SW2. The controller 600 is further configured to control the switch SW1 to be off when the antenna structure 400 operates on the first frequency band and interference received by the first frequency band is greater than a first threshold, and to control the switching of the on or off state of the matching switch SW2 when the antenna structure 400 operates on the first frequency band and interference received by the first frequency band is greater than a second threshold and less than the first threshold. The second threshold is less than the first threshold.

That is, in some other embodiments, the controller 600 may control the switch SW1 or the matching switch SW2 based on a degree of interference received by the first frequency band. When the antenna structure 400 operates on the first frequency band and the interference received by the first frequency band is greater than the first threshold, the interference is large, and the controller 600 may disconnect a feed path of the second feed S2 by directly controlling the switch SW1 to be off, so that the interference to the first frequency band can be effectively avoided. When the antenna structure 400 operates on the first frequency band and the interference received by the first frequency band is greater than the second threshold and less than the first threshold, the controller 600 controls the matching switch SW2 to switch the on or off state, so that the operating frequency of the second radiation stub 42 under the excitation of the second feed S2 can be adjusted to a frequency on the second frequency band that does not overlap the first frequency band, so that the operating frequency of the second radiation stub is different from frequencies on the first frequency band, and the quality of the electromagnetic wave signals on the first frequency band can also be effectively ensured. Moreover, in this case, the frequency at which of the second feed S2 excites the second radiation stub 42 is maintained, and the bandwidth can be effectively increased.

The switch SW1 and the at least one matching switch SW2 may be transistors such as MOS transistors and triodes.

The controller 600 may be further configured to perform other control functions. Details are not described herein. The controller 600 may be a single-chip microcomputer, a digital signal processor, a central processing unit, and the like.

In the antenna structure 400 and the electronic device 1000 according to this application, the radiation stubs of the antenna structure 400 can be allowed to be arranged at parts often held by the user, and the antenna performance is not affected by the holding by the user, so that the space of the electronic device 1000 can be effectively used to arrange the radiation stubs with larger sizes, thereby effectively improving the antenna performance.

The description is provided herein with reference to various example embodiments. However, a person skilled in the art shall be aware that changes and modifications may be made to the example embodiments without departing from the scope herein. For example, various operational steps and assemblies configured to perform the operational steps can be implemented in different manners based on specific applications or considering any quantity of cost functions associated with system operations (for example, one or more steps may be deleted, modified, or combined into other steps).

In addition, as understood by a person skilled in the art, the principles herein can be reflected in a computer program product on a computer-readable storage medium, and the readable storage medium is preloaded with computer-readable program code, that is, program instructions. Any tangible and non-transitory computer-readable storage medium can be used, including a magnetic storage device (a hard disk, a floppy disk, or the like), an optical storage device (a CD-ROM, a DVD, a Blu Ray disc, or the like), a flash memory, and/or the like. These computer program instructions can be loaded onto a general-purpose computer, a special-purpose computer, or another programmable data processing device to form a machine, so that these instructions, which are executed on a computer or another programmable data processing apparatus, can generate an apparatus for implementing a specified function. These computer program instructions may alternatively be stored in a computer-readable memory. The computer-readable memory can instruct a computer or another programmable data processing device to operate in a specific manner, so that the instructions stored in the computer-readable memory can form a manufacture, which includes an implementation apparatus for implementing a specified function. These computer program instructions may alternatively be loaded on a computer or another programmable data processing device, so that a series of operation steps are performed on the computer or the another programmable device to generate a computer-implemented process, and therefore the instructions executed on the computer or the another programmable device can provide steps for implementing a specified function.

The foregoing descriptions are merely specific implementations of this application, but are not intended to limit the protection scope of this application. Any variation or replacement readily figured out by a person skilled in the art within the technical scope disclosed in this application shall fall within the protection scope of this application. The embodiments of this application and the features in the embodiments can be combined with each other when no conflict occurs. Therefore, the protection scope of this application shall be subject to the protection scope of the claims.

The invention claimed is:

1. An antenna structure, comprising:

a first radiation stub, wherein the first radiation stub comprises two grounding points and a first feed point, the first feed point is located between the two grounding points, the two grounding points are configured for grounding, the first radiation stub is spaced apart from a ground connected to the two grounding points to form a slot, and the first radiation stub forms a slot antenna;

a second radiation stub having a gap with the first radiation stub, wherein the second radiation stub is coupled to the first radiation stub through the gap;

a first feed electrically connected to the first feed point of the first radiation stub and configured to provide a first feed signal for the first radiation stub by using the first feed point, and couple and load the first feed signal to the second radiation stub through the gap, so that the first radiation stub and the second radiation stub support transceiving of electromagnetic wave signals on a first frequency band;

a second feed; and a third matching circuit;

wherein a resonant frequency at which the first radiation stub operates under excitation of the first feed signal is a first resonant frequency, a resonant frequency at which the second radiation stub operates under excitation of the first feed signal is a second resonant frequency, the second resonant frequency is greater than the first resonant frequency, and the first frequency band comprises a frequency range from the first resonant frequency to the second resonant frequency;

wherein the second radiation stub comprises a second feed point, the second feed is connected to the second feed point by using the third matching circuit, and provides a second feed signal for the second radiation stub, to excite the second radiation stub to operate on a second frequency band; and wherein the third matching circuit comprises a plurality of matching elements and at least one matching switch, at least one matching element of the plurality of matching elements is connected in series to a matching switch of the at least one matching switch, and the matching switch is configured to switch an on state or an off state when the antenna structure operates on the first frequency band, so as to adjust an operating frequency of the second radiation stub under excitation of the second feed.

2. The antenna structure according to claim 1, wherein the two grounding points comprise a first grounding point and a second grounding point, the first grounding point is arranged on the first radiation stub at a position closer to a first end than a second end, the second grounding point is arranged on the first radiation stub at a position closer to the second end than the first end, the first end is an end of the first radiation stub away from the second radiation stub, the second end is an end of the first radiation stub adjacent to the second radiation stub, the antenna structure further comprises a first matching circuit, the first grounding point is directly grounded, and the second grounding point is grounded by using the first matching circuit.

3. The antenna structure according to claim 2, wherein the first matching circuit comprises a matching inductor.

4. The antenna structure according to claim 2, wherein the antenna structure further comprises a second matching circuit, and the first feed is electrically connected to the feed point of the first radiation stub by using the second matching circuit.

5. The antenna structure according to claim 4, wherein the second matching circuit comprises a plurality of matching elements, and the plurality of matching elements comprise at least one of an inductor or a capacitor.

6. The antenna structure according to claim 2, wherein on the first radiation stub, from the second grounding point to the second end, a current decreases and an electric field is enhanced, so that an electric field strength at a position of the gap is greater than an electric field strength at a position of the second grounding point.

7. The antenna structure according to claim 6, wherein the antenna structure is installed in an electronic device, the first radiation stub is arranged on a side edge of the electronic device, and the second radiation stub extends and is arranged on the side edge and a bottom end of the electronic device.

8. The antenna structure according to claim 1, wherein the antenna structure further comprises a switch, the switch is connected between the third matching circuit and the second feed point, and the switch is configured to be off when the antenna structure operates on the first frequency band.

9. The antenna structure according to claim 1, wherein a length of the second radiation stub is ½ of a wavelength corresponding to the second resonant frequency.

10. The antenna structure according to claim 1, wherein the second radiation stub comprises a third grounding point, the third grounding point is configured for grounding, and a length of a part of the second radiation stub that is located between the third grounding point and the gap is ¼ of a wavelength corresponding to the second resonant frequency.

11. The antenna structure according to claim 1, wherein the first frequency band is a GPS L5 frequency band.

12. The antenna structure according to claim 1, wherein the antenna structure is used in an electronic device, and the electronic device comprises a top end, a bottom end, and a side edge located between the top end and the bottom end; and wherein the antenna structure is installed in the electronic device, the first radiation stub is arranged on the side edge of the electronic device, the second radiation stub extends and is arranged on the side edge and the bottom end of the electronic device, and the second radiation stub is away from the top end of the electronic device relative to the first radiation stub.

13. The antenna structure according to claim 12, wherein the first radiation stub is located on the side edge of the electronic device and has a preset distance from the top end of the electronic device, the first radiation stub is elongated, the second radiation stub comprises a first sub-stub and a second sub-stub, the first sub-stub is arranged at an included angle with the second sub-stub, the first sub-stub is adjacent to the first radiation stub to have the gap with the first radiation stub, and the first sub-stub is parallel to the first radiation stub; and wherein the first radiation stub is located on the side edge of the electronic device, the first sub-stub of the second radiation stub is located on the side edge of the electronic device at a position close to the bottom end, and the second sub-stub of the second radiation stub is located at the bottom end of the electronic device.

14. An electronic device, wherein the electronic device comprises an antenna structure, and wherein the antenna structure comprises:

a first radiation stub, wherein the first radiation stub comprises two grounding points and a first feed point, the first feed point is located between the two grounding points, the two grounding points are configured for grounding, the first radiation stub is spaced apart from a ground connected to the two grounding points to form a slot, and the first radiation stub forms a slot antenna;

a second radiation stub having a gap with the first radiation stub, wherein the second radiation stub is coupled to the first radiation stub through the gap;

a first feed electrically connected to the first feed point of the first radiation stub and configured to provide a first feed signal for the first radiation stub by using the first feed point, and couple and load the first feed signal to the second radiation stub through the gap, so that the first radiation stub and the second radiation stub support transceiving of electromagnetic wave signals on a first frequency band;

a second feed; and a third matching circuit;

wherein a resonant frequency at which the first radiation stub operates under excitation of the first feed signal is a first resonant frequency, a resonant frequency at which the second radiation stub operates under excitation of the first feed signal is a second resonant frequency, the second resonant frequency is greater than the first resonant frequency, and the first frequency band comprises a frequency range from the first resonant frequency to the second resonant frequency;

wherein the second radiation stub comprises a second feed point, the second feed is connected to the second feed point by using the third matching circuit, and provides a second feed signal for the second radiation stub, to excite the second radiation stub to operate on a second frequency band; and wherein the third matching circuit comprises a plurality of matching elements and at least one matching switch, at least one matching element of the plurality of matching elements is connected in series to a matching switch of the at least one matching switch, and the matching switch is configured to switch an on state or an off state when the antenna structure operates on the first frequency band, so as to adjust an operating frequency of the second radiation stub under excitation of the second feed.

15. The electronic device according to claim 14, wherein the electronic device comprises a top end, a bottom end, and a side edge located between the top end and the bottom end, the first radiation stub is arranged on the side edge of the electronic device, and the second radiation stub extends and is arranged on the side edge and the bottom end of the electronic device.

16. The electronic device according to claim 14, wherein a frame of the electronic device is a metal frame, and the first radiation stub and the second radiation stub are two metal frame segments formed by providing a gap in the metal frame of the electronic device.

17. The electronic device according to claim 14, wherein a frame of the electronic device is a nonmetallic frame, and the first radiation stub and the second radiation stub are metal segments arranged in the frame of the electronic device.

* * * * *